(12) United States Patent
Boyd et al.

(10) Patent No.: US 12,094,005 B1
(45) Date of Patent: Sep. 17, 2024

(54) SYSTEMS AND METHODS FOR A USER INTERFACE AND APPLICATION FOR SIMULATING CONSTRUCTION AND OPTIMIZATION OF AN INVESTMENT PORTFOLIO

(71) Applicant: BlackRock, Inc., New York, NY (US)

(72) Inventors: Stephen Boyd, Stanford, CA (US); Mykel Kochenderfer, Palo Alto (CA); Raphael Benarrosh, New York, NY (US); Pam Chan, New York, NY (US); Vidyasagar Vairavamurthy, Roselyn, NY (US); Garson Brandon Levy, New York, NY (US); Jonathan Callan, Hoboken, NJ (US); Pascal Nguyen, London (GB)

(73) Assignee: BlackRock, Inc., New York, NY (US)

( * ) Notice: Subject to any disclaimer, the term of this patent is extended or adjusted under 35 U.S.C. 154(b) by 0 days.

(21) Appl. No.: 17/861,520

(22) Filed: Jul. 11, 2022

Related U.S. Application Data

(60) Provisional application No. 63/270,337, filed on Oct. 21, 2021.

(51) Int. Cl.
  *G06Q 40/06* (2012.01)
  *G06F 3/0482* (2013.01)
  *G06F 3/04845* (2022.01)
  *G06F 3/04847* (2022.01)

(52) U.S. Cl.
  CPC .......... *G06Q 40/06* (2013.01); *G06F 3/0482* (2013.01); *G06F 3/04845* (2013.01); *G06F 3/04847* (2013.01)

(58) Field of Classification Search
  None
  See application file for complete search history.

(56) References Cited

U.S. PATENT DOCUMENTS

| | | | | |
|---|---|---|---|---|
| 7,774,257 | B2 * | 8/2010 | Maggioncalda | G06Q 40/00 705/36 R |
| 8,296,221 | B1 * | 10/2012 | Waelbroeck | G06Q 40/04 705/37 |
| 2002/0138383 | A1 * | 9/2002 | Rhee | G06Q 40/04 705/36 R |

(Continued)

*Primary Examiner* — Narayanswamy Subramanian
(74) *Attorney, Agent, or Firm* — Haynes and Boone, LLP

(57) ABSTRACT

Embodiments directed to simulating a portfolio of alternative investments. Cash flow templates are generated from cash flow parameters. Cash flows for various asset classes of alternative investments are generated from the cash flow templates. A Markowitz optimization generates investment allocations into the asset classes using cash flows and a risk parameter, such that the investment allocations maximize a cash flow of the portfolio for a corresponding value of the risk parameter. The investment allocations into the asset classes as a function of risk are displayed on a first user interface and a cash flow corresponding to the investment allocations is displayed on a second user interface. The first and second user interface are inter-related, such that a movement of a computer-generated marker along a risk axis in the first user interface that causes changes to the investment allocations also causes changes to the cash flow displayed on the second user interface.

18 Claims, 19 Drawing Sheets

(56) References Cited

U.S. PATENT DOCUMENTS

| | | | | |
|---|---|---|---|---|
| 2006/0020531 A1* | 1/2006 | Veeneman | ............. | G06Q 40/00 |
| | | | | 705/35 |
| 2008/0162238 A1* | 7/2008 | subbu | ................ | G06Q 10/0637 |
| | | | | 705/7.11 |
| 2015/0348195 A1* | 12/2015 | Weber | .................... | G06Q 40/06 |
| | | | | 705/36 R |
| 2016/0110812 A1* | 4/2016 | Mun | ...................... | G06Q 40/06 |
| | | | | 705/36 R |
| 2018/0096432 A1* | 4/2018 | Varma | .................... | G06Q 40/06 |

* cited by examiner

SYSTEMS AND METHODS FOR A USER INTERFACE AND APPLICATION FOR SIMULATING CONSTRUCTION AND OPTIMIZATION OF AN INVESTMENT PORTFOLIO

RELATED APPLICATIONS

This application claims the benefit of U.S. Provisional Application No. 63/270,337 filed on Oct. 21, 2021, the disclosure of which is incorporated herein in its entirety.

TECHNICAL FIELD

The present application generally relates to simulations, and more specifically to a user interface and an application for simulating construction and optimization of a portfolio of alternative investments.

BACKGROUND

There are various techniques for constructing a portfolio of investments that has a predicted rate of return. However, these techniques may not accurately predict a return of a portfolio of alternative investments.

Figure 1:
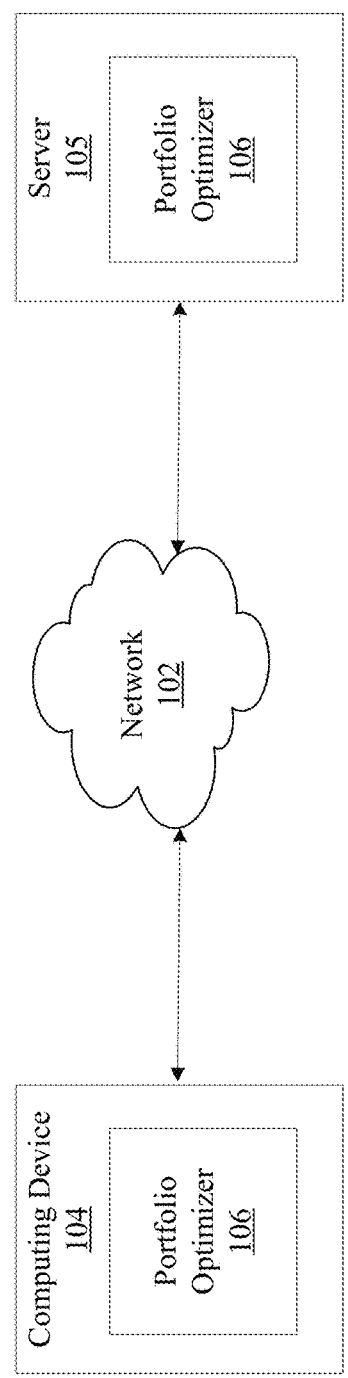
FIG. 1 is a block diagram illustrating a computing environment where embodiments may be implemented.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are systems and methods for optimizing a portfolio of alternative investments. A cash flow for a portfolio may be generated from one-time or static allocation of commitments or investments into a set of asset classes. The portfolio is then optimized with the goal of achieving a high internal rate of return while controlling risk and respecting various constraints. A portfolio may also undergo multiple periods of investing. In a multi-period investing, commitments or investment allocations may be made over multiple periods. The commitments may be irrevocable and may not be changed once commitments are made. A portfolio where commitments are made over multiple periods may be optimized using a model-predictive control (MPC) method that takes into account previous commitments.

In some embodiments, a user interface of a portfolio optimizer may be provided. The user interface may include a diagram that illustrates commitments or investment allocations that may be made to various asset classes as a function of risk. For each risk value, the user interface may also illustrate diagrams showing cumulative commitments, commitments that may be made in the asset classes over multiple periods and a cash flow for a portfolio generated from the commitments. The user interface may also interrelate various diagrams where instructions that cause changes in one diagram, e.g. changes to a risk value, result in a real-time changes to other diagrams that show periodic commitments, cumulative commitments, and a cash flow for the portfolio.

FIG. 1 is an exemplary system 100 where embodiments can be implemented. System 100 includes a network 102. Network 102 may be implemented as a single network or a combination of multiple networks. For example, in various embodiments, network 102 may include the Internet or one or more intranets, landline networks, wireless networks, and/or other appropriate types of networks. Network 102 may be a small-scale communication network, such as a private or local area network, or a larger scale network, such as a wide area network. Network 102 may be accessible by various components of system 100.

System 100 also includes one or more computing devices 104 and servers 105, although only one is shown of each. Computing devices 104 may be portable and non-portable electronic devices under control of a user and configured to transmit, receive, and manipulate data, execute various applications, and communicate with other devices connected to network 102. Example computing devices 104 may be desktop computers, laptop computers, tablets, smartphones, wearable computing devices, eyeglasses that incorporate computing devices, implantable computing devices, etc.

In some embodiments, network 102 may also include servers 105. Servers 105 may be computer software programs or hardware devices that allow computing devices 104 to access centralized applications, provide processing capabilities and facilitate distribution of data throughout network 102. Servers 105 may also store data associated with various alternative investments in multiple asset classes, such as availability of the alternative investments, risk associated with alternative investments, and price of the alternative investments. The information about alternative investments may be obtained from other devices, e.g. other servers 105 connected to network 102 (not shown). Alternative investments are discussed in more detail below.

Computing devices 104 and servers 105 may execute a portfolio optimizer 106. Portfolio optimizer 106 may generate simulations of portfolios of investments, including alternative investments, given a certain monetary commitment. The simulations may be shown on a user interface of portfolio optimizer 106 and provide a visual aide for identifying an optimized portfolio for a particular risk parameter. The simulations may include assets from various asset classes that comprise the portfolio, cash flows from these assets and/or initial or periodic commitment(s) that may be made in the portfolio.

In some embodiments, portfolio optimizer 106 may execute on computing device 104 or server 105. In other embodiments, portfolio optimizer 106 may execute in part on one or more computing devices 104 and in part on one or more servers 105. In some instances, a user interface portion of portfolio optimizer 106 may execute on computing device 104 and an optimization, simulation, and/or analytics portion may execute on server 105. Portfolio optimizer 106 with portions executing on computing device 104 and server 105 may include a communication interface for receiving and transmitting data between the portions.

Figure 2:
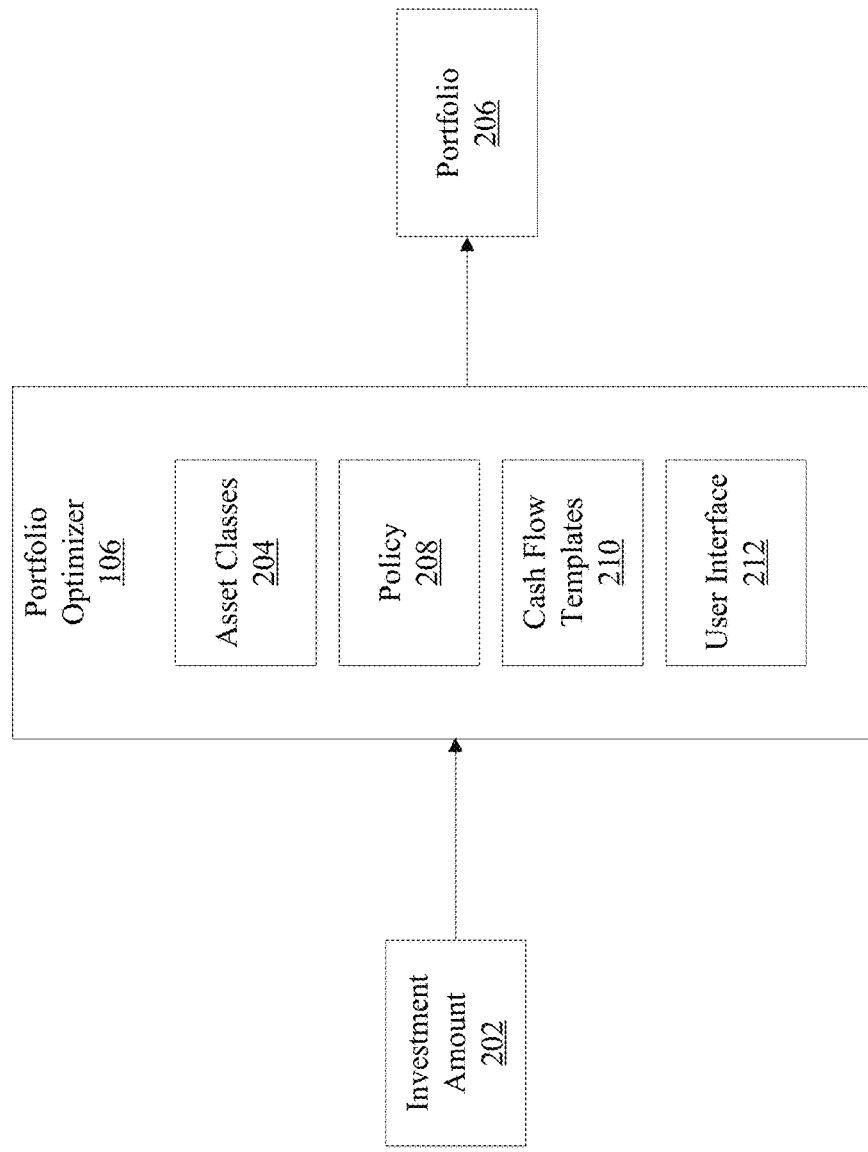
FIG. 2 is a block diagram illustrating a portfolio optimizer, according to some embodiments.

FIG. 2 is a block diagram 200 illustrating a portfolio optimizer, according to some embodiments. Portfolio optimizer 106 may receive an investment amount 202. Investment amount 202 may be received as a one-time amount or over multiple time periods. Portfolio optimizer 106 simulates commitments or investment allocations of different portions of investment amount 202 to various asset classes 204. Asset classes 204 may be alternative asset classes in some embodiments. An example alternative asset class 204 may include private equity, which includes companies not listed on a public stock exchange, private debt or credit, hedge funds, real estate, commodities, infrastructure, collectables, structured products, etc. Portfolio optimizer 106 may simulate allocations of different portions of investment amount 202 to different asset classes 204 in portfolio 206. The simulations may identify portfolio allocations that maximize cash flow from portfolio 206 while minimizing or controlling investment risk. In other words, considering n number of asset classes 204 (where n is a positive integer>0), portfolio optimizer 106 may seek to optimize investment amount 202, such that amounts $\omega_i \geq 0$, i=1, ..., n of investment amount 202 are committed to each asset class i (one of asset classes 204), subject to constraints. These constraints may include limits on a portion of investment amount 202 in each one of asset classes 204 and a given total budget B, with $\omega_1 \ldots \omega_n = B$. The total budget B may be investment amount 202.

In some embodiments, each one of asset classes 204 may have a cash flow over the life of the fund spanning T periods. Each period may include a predefined number of quarters, e.g., T=60 quarters. The cash flow includes the effects of capital calls or contributions and capital distributions. Capital calls may be payments made to purchase the investments in asset classes 204. Capital distributions may be payments received from the investments or from selling the investments. A goal of portfolio optimizer 106 is to generate a portfolio allocation for portfolio 206 that achieves high internal rate of return (IRR) for the whole portfolio 206 while controlling risk. In some embodiments, portfolio 206 may be represented by the n-vector w.

As discussed above, portfolio optimizer 106 may dynamically construct portfolio 206 over multiple periods. In a dynamic portfolio construction, commitments (e.g., portions of investment amount 202) are made over a set of periods t=1, ..., S, with S<<T (e.g., S=12 quarters), while the cash flows from these commitments extend over the longer time period t=1, ..., T, with T>S. In this embodiment, $\omega_{i,s} \geq 0$ may denote the dollar amount of investment amount 202 that is committed to asset class i in period s. These commitments may be illiquid and irrevocable. In some embodiments, $\omega_{i,s}$, for i=1, ..., n may be selected sequentially, i.e., first for s=1 (the initial commitments), next for s=2 (the second period commitments), and so on. The commitments made during period s may depend on updated forecasts available, and on past commitments. The past commitments may be suggested by portfolio optimizer 106. For example, suppose commitment of one million dollars is targeted for a particular asset class at a particular time period. However, a smaller commitment may actually be made due to limited deal availability. Alternatively, a larger commitment may be made if some very promising deals become available. In the multi-period portfolio optimization, portfolio optimizer 106 may generate a policy 208. Policy 208 may be a method to choose the commitments $\omega_{i,s}$, i=1, ..., n, based on information available in period s as well as prior commitments.

Cash Flow Metrics

In some embodiments, to determine policy 208, portfolio optimizer 106 may first determine cash flow from each asset in each asset class 204. For example, for a particular investment amount (e.g. a portion of investment amount 202) in an asset in one of asset classes 204, there may be a time series of capital calls $c^{call}$ and capital distributions $c^{dist}$ that occur over a time period T. The amount of a capital call at time t is $c_t^{call}$. The amount of a capital distribution at time t is $c_t^{dist}$. Both capital call $c_t^{call}$ and capital distribution $c_t^{dist}$ may be non-negative. The commitment of the investment, that is a portion of investment amount 202 in an asset, may be a total of the capital calls, $1^T c^{call}$, where 1 is the vector with all entries one. In some embodiments, the total commitment may be less than the commitment predicted using portfolio optimizer 106 due to availability of one or more assets in asset classes 204. The undiscounted total of the capital distributions received from the investment in an asset in one of asset classes 204 may be $1^T c^{dist}$.

In some embodiments, the cash flow metrics may be based on various cash flow parameters. These parameters may include a multiple of invested capital ("MOIC") parameter, weighted average lifetime ("WAL") of the capital calls and distributions, dispersion parameter, and net and cumulative cash flow parameter, net present value ("NPV") parameter, internal rate of return ("IRR") parameter, and commitment normalized cash flows parameter. Each of those parameters are discussed below.

MOIC: A ratio of the total of capital calls to the amount of capital distributions may be referred to as the multiple of invested capital or MOIC. MOIC may be determined as shown below:

$$M = \frac{1^T c^{dist}}{1^T c^{call}} \qquad \text{Eq. (1)}$$

When M<1, the total cash received from an asset is less than the total cash put into an asset, and may be referred to as an undiscounted loss.

WAL and dispersion: as discussed above, the capital call at time t is $c_t^{call}$ and the amount of distributions at time t is $c_t^{dist}$. The capital calls and the amount of distributions illustrate the cadence of the cash flows. Suppose a non-zero and non-negative c* denotes either a capital call or a distribution cash flow. In this case, the weighted average lifetime (WAL) of the calls or distributions may be determined as follows:

$$W^* = \frac{1}{1^T c^*} \sum_{t=1}^{T} t c_t^* \qquad \text{Eq. (2)}$$

The WAL W* has units of time (i.e., periods), and gives a rough summary of when the cash either goes out (for calls) or comes in (for distributions). The dispersion of calls or distributions may be illustrated as follows:

$$D^* = \left( \frac{1}{1^T c^*} \sum_{t=1}^{T} (t - W^*)2_{c_t^*} \right)^{1/2} \qquad \text{Eq. (3)}$$

Dispersion D* also has units of time. The dispersion D* indicates how concentrated in time the cash flow is. The WAL W* and dispersion D* are the mean and standard deviation of the time period when the cash flow is normalized to the sum to one, i.e., to be a probability distribution.

Net and cumulative cash flow: in some embodiments, the net cash flow vector c may be defined as:

$$c = c^{dist} - c^{call} \qquad \text{Eq. (4)}$$

If $c_t$<0, then there is a net flow into the investment. In this case, the capital calls exceed capital distributions in period t. If $c_t$>0, then capital distributions exceed capital calls and there is a net flow out of the investment over period t.

In some embodiments, the cumulative cash flow, denoted $C_t$, may be defined as:

$$C_t = c_1 + \ldots + c_t, t=1, \ldots, T \qquad \text{Eq. (5)}$$

The $C_T = 1^T c$ is the total (undiscounted) net cash flow. The $C_T$<0, represents an undiscounted loss. Further, the cumulative cash flow C may be decomposed into the cumulative capital calls $C^{call}$ and the cumulative distributions $C^{dist}$, such that $C = C^{dist} - C^{call}$.

In some embodiments, the MOIC can be expressed in terms of the terminal cumulative net cash flow as follows:

$$M = \frac{c_T^{dist}}{c_T^{call}} = \frac{c_T}{c_T^{call}} + 1 \qquad \text{Eq. (6)}$$

NPV and IRR: in some embodiments, the net present value ("NPV") at a discount rate r may be represented as follows:

$$N(r) = \sum_{t=1}^{T} \frac{c_t}{(1+r)^t} \qquad \text{Eq. (7)}$$

The N(r) may be a linear function of the cash flow c. N(r) may be decomposed into the NPV due to the capital calls (which is negative) and the NPV due to the distributions (which is positive), as follows:

$$N(r) = -N^{call}(r) + N^{call}(r) \qquad \text{Eq. (8)}$$

with $$N^*(r) = \sum_{t=1}^{T} \frac{c_t^*}{(1+r)^t} \qquad \text{Eq. (9)}$$

where * represents either a call or a distribution.

The internal rate of return ("IRR") may be the smallest rate r (in absolute value) for which N(r)=0, or as follows:

$$N^{call}(r) = N^{dist}(r) \qquad \text{Eq. (10)}$$

The IRR may not be defined when there is no rate r for which N(r)=0, for example, when the cash flow is nonzero and nonnegative.

Commitment normalized cash flows: in some embodiments, cash flows may be normalized to a unit commitment. In this case, the cash flows may be scaled so that $1^T c^{call} = C_T^{call} = 1$. For a normalized cash flow, the distributions in period t per dollar of commitment may be interpreted as $c_t^{dist}$, and similarly for $c_t$ and $C_t$. For the normalized cumulative cash flow, the MOIC may be $C_T+1$.

Cash Flow Templates

In some embodiments, portfolio optimizer 106 may generate cash flow templates 210 using one or more cash flow parameters discussed above. To generate cash flow templates 210, capital calls and distributions may be modeled as having a Gaussian shape or a truncated Gaussian shape over time. A normalized capital call cash flow $c_t^{call}$, for example, may be modeled as follows:

$$c_t^{call} = \alpha \exp - \frac{(t - \mu^{call})^2}{2(\sigma^{call})^2}, t=1, \ldots T \qquad \text{Ex. (11)}$$

where $\mu^{call}$ and $\sigma^{call}$ are positive parameters, and $\alpha$ is the normalizing constant that may be determined as follows:

$$\alpha = \left( \sum_{t=1}^{T} \exp - (t - \mu^{call})^2 / 2(\sigma^{call})^2 \right)^{-1} \qquad \text{Eq. (12)}$$

Eqs. (11) and (12) may ensure that $1^T c^{call} = 1$. Parameters $\mu^{call}$ and $\sigma^{call}$ may define the shape of the capital calls over time. Roughly, $\mu^{call}$ is the time of the largest capital call, or the time when half the committed capital has been called, and $\sigma^{call}$ describes the dispersion of the capital calls around that time. Parameter $\mu^{call}$ is approximately the undiscounted WAL of the capital calls, and parameter $\sigma^{call}$ is approximately the dispersion of the capital calls.

The normalized distributions $c_t^{dist}$ may also have a Gaussian shape or a truncated Gaussian shape and may be modeled as follows:

$$c_t^{dist} = \alpha \exp - (t - \mu^{dist})^2 / 2(\sigma^{dist})^2, t=1, \ldots, T \qquad \text{Eq. (13)}$$

where $\mu_{dist}$ and $\sigma_{dist}$ are positive parameters, and a is the normalizing constant that may be determined as follows:

$$\alpha = M\left(\sum_{t=1}^{T}\exp-(t-\mu^{dist})^2/2(\sigma^{dist})^2\right)^{-1} \quad \text{Eq. (14)}$$

where M is the MOIC.

As illustrated above, cash flow templates 210 may be modeled using multiple cash flow parameters from the cash flow metrics. In a non-limiting embodiment, these parameters may be M (MOIC), $\mu^{call}$ representing an approximate time when half of the capital has been called, $\sigma^{call}$ representing dispersion in time of the capital calls, $\mu_{dist}$ representing the approximate time when half of the distributions have been made, and $\sigma_{dist}$ representing the dispersion in time of the distributions. Cash flow templates 210 may be defined using different values for the cash flow parameters for different asset classes 204. An example cash flow template 210 for asset classes 204 that include a buyout, a venture capital, a real estate equity, a private credit, and an infrastructure classes with corresponding values for cash flow parameters M, $\mu^{call}$, $\sigma^{call}$, $\mu^{dist}$, and $\sigma^{dist}$ is illustrated in Table I, below.

TABLE I

| Asset class | M | $\mu^{call}$ | $\sigma^{call}$ | $\mu^{dist}$ | $\sigma^{dist}$ |
|---|---|---|---|---|---|
| Buyout | 1.63 | 12 | 12 | 31 | 9 |
| Venture Capital | 1.34 | 11 | 10 | 32 | 9 |
| Real Estate Equity | 1.46 | 9 | 8 | 25 | 8 |
| Private Credit | 1.27 | 7 | 6 | 21 | 5 |
| Infrastructure | 1.51 | 8 | 8 | 26 | 8 |

Figure 3:
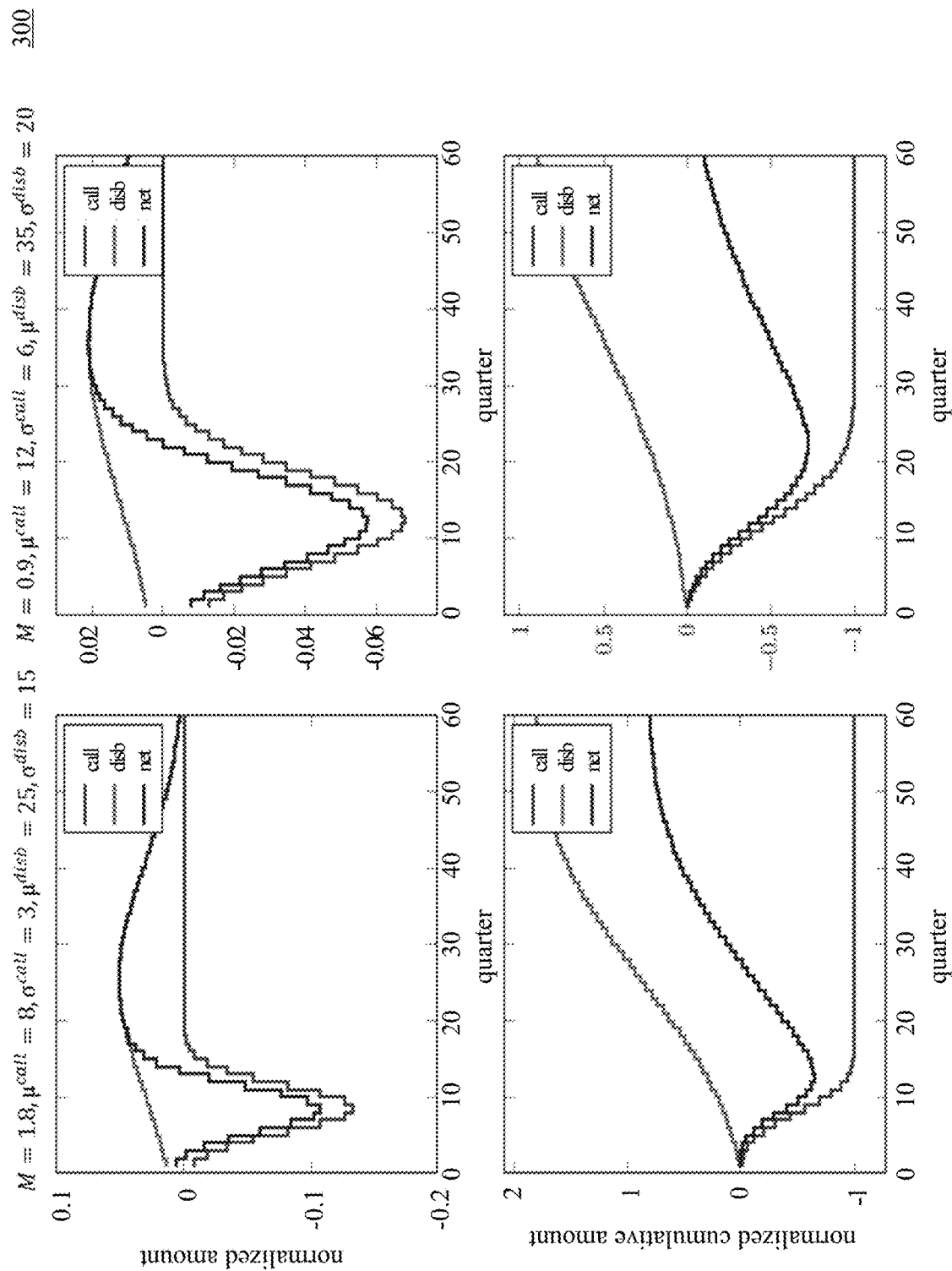
FIG. 3 illustrates diagrams of cash flows and cumulative cash flows for different cash flow parameters, according to some embodiments.

FIG. 3 illustrates is a diagram 300 illustrating graphs for cash flows and cumulative cash flows for two sets of cash flow parameters over the period T=60, according to some embodiments. The two left graphs illustrate cash flows and cumulative cash flows for cash flow parameters M=1.8 and IRR=3.91%, which represents 15.7% annual returns. The two right graphs illustrate cash flows and cumulative cash flows for cash flow parameters M=0.9, which represents an undiscounted loss, and IRR=−0.45%, which represents approximately −1.8% annual returns.

Stochastic Model of MOIC

Going back to FIG. 2, in some embodiments, portfolio optimizer 106 may use a log-normal MOIC model to model the uncertainty in cash flows. For a single alternative investment cash flow, an uncertainty in an investment cash flow may be modeled by treating the MOIC parameter M in the cash flow template as a random variable, with the other cash flow parameters being fixed depending on the parameters' asset class. In some instances, a log-normal distribution may be used to model parameter M. This means that log M~$\mathcal{N}(\mu, \sigma^2)$, where $\mu$ is the mean of the log MOIC, and $\sigma$ is a standard deviation of M. These are unrelated to the $\mu$ and $\sigma$ that define the shape of the capital calls and capital distributions over time. The cash flow parameters have units of time periods, while the statistical parameters for the distribution of MOIC M are unitless.

Because the MOIC M follows a log-normal distribution, both the median and mode of the MOIC M are $e^{\mu}$. The mean MOIC M is $e^{\mu+\sigma^2/2}$. The probability of $M \leq M^{tar}$ is $\Phi((\log M^{tar}-\mu)/\sigma)$, where $\Phi$ is a cumulative distribution function (CDF) of a standard Gaussian distribution. For example, the probability of an undiscounted loss, i.e., $M \leq 1$, is $\Phi(-\mu/\sigma)$. The q-quantile of the MOIC is $\exp(\mu+\sigma\Phi^{-1}(q))$.

Figure 4:
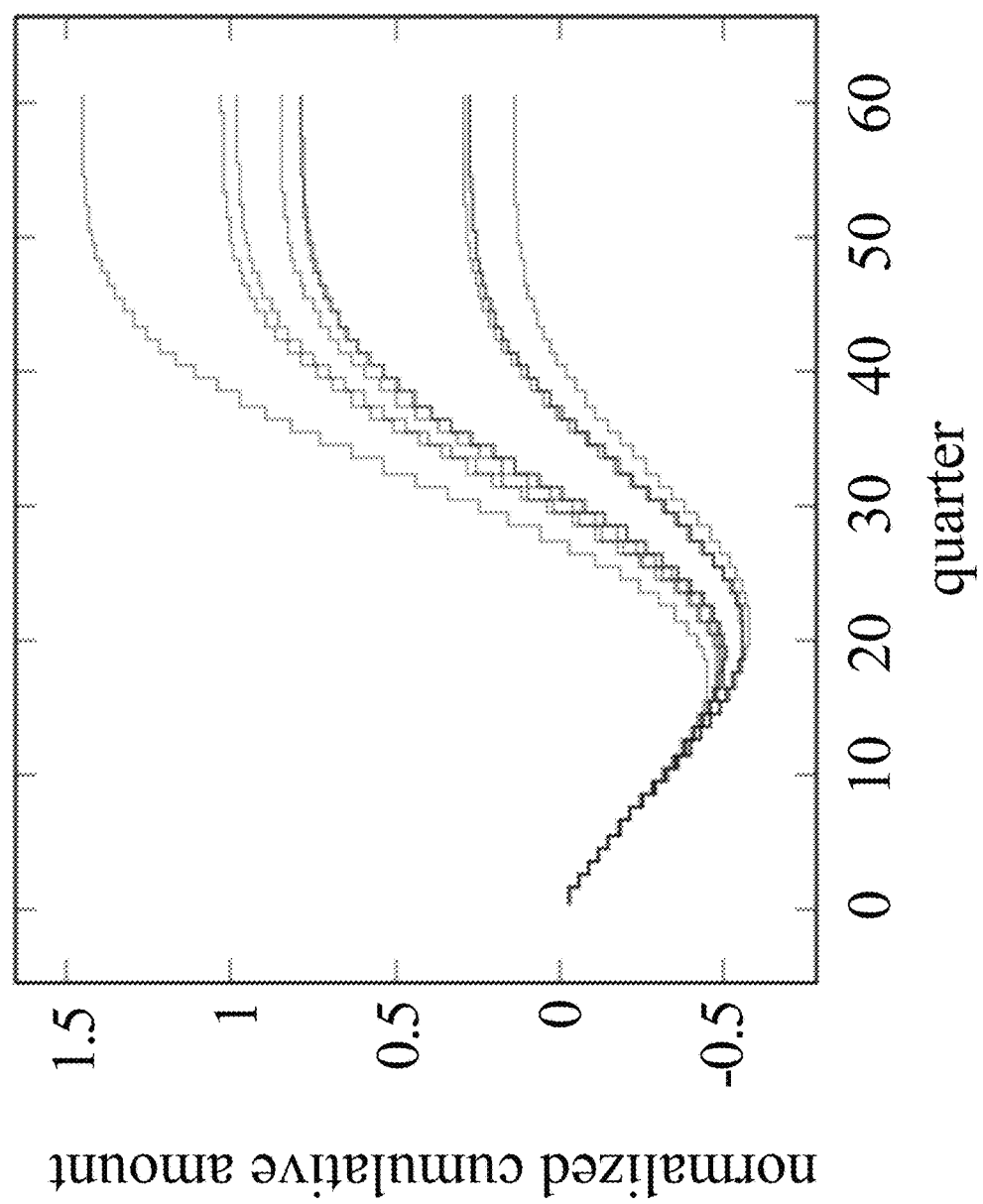
FIG. 4 illustrates a diagram of cash flows for an asset class for different values of a multiple of invested capital (MOIC) parameter with other cash flow parameters being fixed, according to some embodiments.

FIG. 4 is a diagram 400 illustrating a graph having cash flows for an asset class for different values of MOIC M with other cash flow parameters remaining fixed, according to some embodiments. In FIG. 4, an asset class may be a buyout asset class. The cash flow parameters for the buyout asset class are from Table I, above, with $\mu=0.293$ and $\sigma=0.492$ and for ten different values of MOIC M.

In some embodiments, portfolio optimizer 106 may model the MOIC M of multiple asset classes 204, such as n possible asset classes 204, as a jointly log-normal. In this case, M is an n-vector of MOICs (vector M) over asset classes 204 and log M~$\mathcal{N}(\mu,\Sigma)$, where portfolio optimizer 106 applies the log elementwise to the vector M. The mean of log MOIC is specified by the vector $\mu \in R^n$. One way to specify the covariance matrix $\Sigma$ is in terms of the marginal standard deviations of log MOIC, denoted $\sigma_i$, i=1, . . . , n and the correlations between log MOIC across asset classes 204, denoted $\rho_{ij}$, i, j=1, . . . , n. In this case, the covariance matrix 2 may be defined as follows:

$$\Sigma_{ij}=\sigma_i\sigma_j\rho_{ij}, i,j=1,\ldots,n \quad \text{Eq. (15)}$$

Table 2, below, illustrates some values for the mean u and standard deviation $\sigma$ parameters of the log MOIC model for the five asset classes 204, including buyout, venture capital, real estate equity, private credit, and infrastructure:

TABLE II

| | $\mu$ | $\sigma$ |
|---|---|---|
| Buyout | 0.486 | 0.287 |
| Venture Capital | 0.293 | 0.492 |
| Real Estate Equity | 0.376 | 0.215 |
| Private Credit | 0.238 | 0.130 |
| Infrastructure | 0.412 | 0.227 |

Table 3, below, provides correlations between the log MOIC of the five asset classes 204, including buyout, venture capital, real estate equity, private credit, and infrastructure:

TABLE III

| | Buyout | Venture Capital | R. E. Equity | Private Credit | Infrastructure |
|---|---|---|---|---|---|
| Buyout | 1.00 | 0.59 | 0.78 | 0.74 | 0.71 |
| Venture Capital | 0.59 | 1.00 | 0.51 | 0.45 | 0.42 |
| Real Estate Equity | 0.78 | 0.51 | 1.00 | 0.62 | 0.79 |
| Private Credit | 0.74 | 0.45 | 0.62 | 1.00 | 0.61 |
| Infrastructure | 0.71 | 0.42 | 0.79 | 0.61 | 1.00 |

Portfolio optimizer 106 may simulate cash flows for portfolio 206 using a portion of investment amount 202, such as amount $\omega_i \geq 0$, in each of n asset classes 204 and according to various cash flow templates 210. Portfolio optimizer 106 may determine the amount of cash flow from the portfolio 206 of investments, by scaling the normalized cash flows for each asset class and adding the normalized cash flows. For example, the portfolio cash flow may be $$p = \sum_{i=1}^{n} w_i c_i,$$

where $c_i$ is the normalized cash flow of asset class i in asset classes 204. The portfolio cash flow p may be a T-vector, which gives the total net cash flow of the portfolio 206 in each time period. It is random, since the MOIC of the asset classes, the vector M, is random. This means that any metric of the portfolio cash flow p, for example IRR, is also random.

Portfolio optimizer 106 may evaluate a distribution of various cash flow metrics in portfolio 206, including MOIC, NPV, or IRR metrics discussed above. To evaluate the cash flow metrics, portfolio optimizer 106 may use a Monte Carlo simulation. In the Monte Carlo simulation, portfolio optimizer 106 may draw a large number of samples of M from the log-normal distribution and evaluate the cash flow metrics on the portfolio cash flows.

In some embodiments, portfolio optimizer 106 may evaluate the 30$^{th}$ percentile IRR for portfolio 206, the probability of an undiscounted loss, or the probability that the IRR exceeds some target IRR. Portfolio optimizer 106 may plot the median and other quantiles of cumulative cash flow $C_t$ versus t. These simulations are useful in understanding the realized cash flows and resulting performance of portfolio 206. Notably, for each portfolio cash flow $p_t$, the portfolio cash flow in period t, is not a log-normal, but is a sum of log-normals.

Figure 5A:
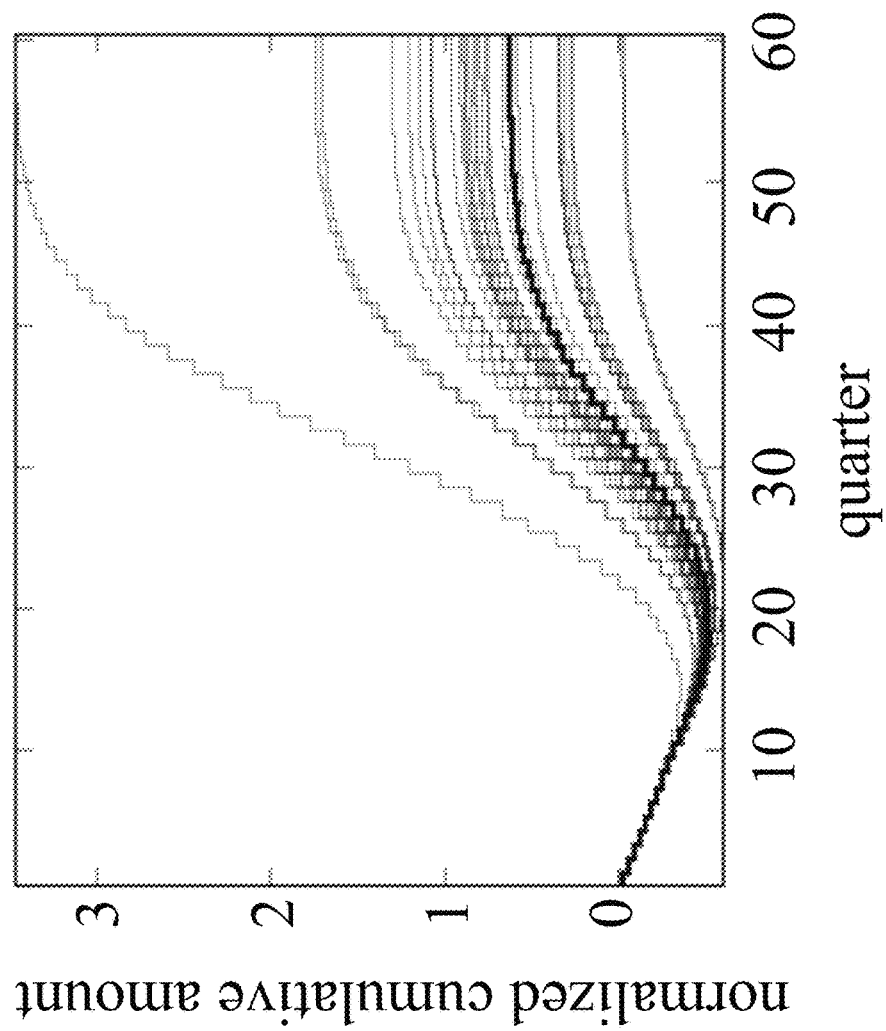
FIG. 5A illustrates a diagram of a normalized portfolio cash flow, according to some embodiments.
Figure 5B:
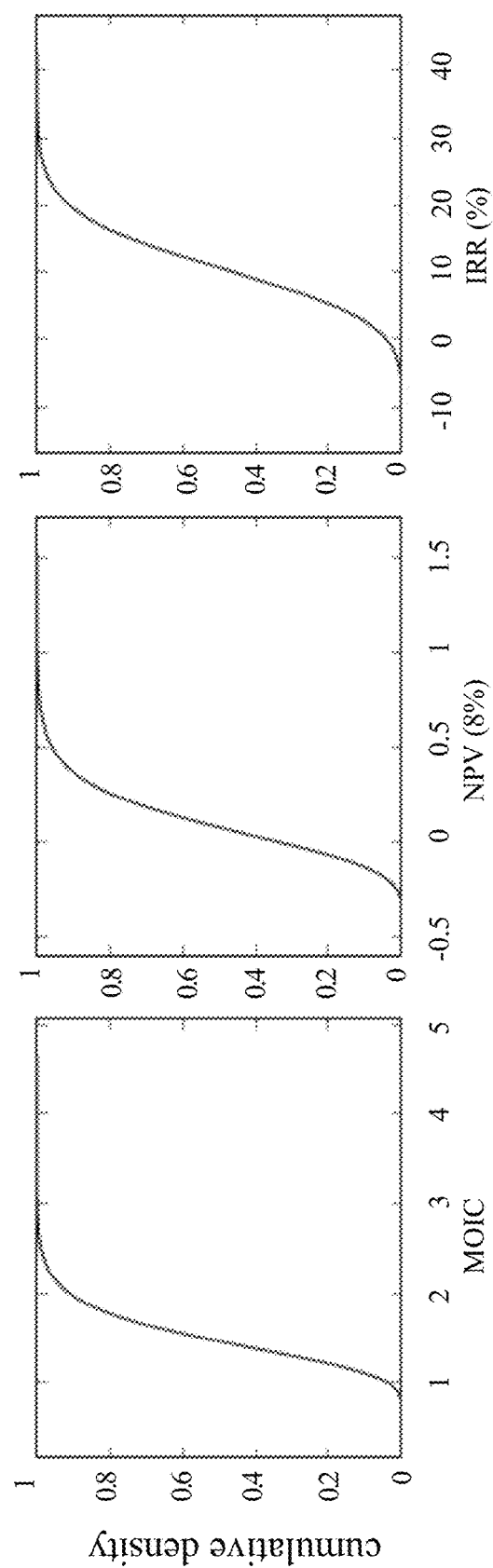
FIG. 5B illustrates diagrams of cumulative distribution functions for a multiple of invested capital (MOIC) parameter, a net present value (NPV) parameter, and an internal rate of return (IRR) parameter of a portfolio having a normalized cash flow shown in FIG. 5A.

FIG. 5A is a diagram 500A of a graph illustrating ten simulations of a normalized portfolio cumulative cash flow from the five asset classes discussed above and with a uniform commitment of 0.2 from investment amount 202 in each asset class, according to some embodiments. FIG. 5B is a diagram 500B of graphs illustrating the cumulative distribution functions of MOIC, IRR, and NPV metrics for a portfolio with the cumulative cash flow in FIG. 5A. The MOIC, IRR, and NPV metrics may be obtained by Monte Carlo simulation, where NPV has rate r=2% and corresponds to an annual interest rate=8%. FIG. 5B illustrates that the probability of an undiscounted loss is around 2%, while the probability of IRR is less than 4% which corresponds to an annual interest rate of around 13%. The simulations take into account a number of aspects of portfolio 206, including the divergent cash flow shapes for the divergent asset classes 204, the uncertainty in the performance for each asset class 204, and the correlations among the asset classes 204.

In some embodiments, portfolio optimizer 106 may evaluate portfolio NPV mean and variance. Suppose for fixed values of the cash flow parameters, the NPV of a cash flow, at any discount rate, is an affine function of the MOIC, and has a form of N(r)=a+bM, where:

$$a = -\sum_{t=1}^{T} \frac{c_t^{call}}{(1+r)^t}$$ Eq. (16)

is the NPV of the normalized capital calls, and is negative, and $$b = \sum_{t=1}^{T} \frac{c_t^{dist}}{(1+r)^t}$$ Eq. (17)

is the NPV of the normalized distributions when M=1, and is positive.

For each asset class i, portfolio optimizer 106 may pre-compute the coefficients $a_i$ and $b_i$, which depend on the cash flow parameters $\mu_i^{call}$, $\sigma_i^{call}$, $\mu_i^{dist}$, $\sigma_i^{dist}$, and the interest rate r. The interest rate may be around 0.0194, which corresponds to an annual rate=8%. Eq. (18), below, demonstrates a relationship between the vector of asset NPV N and the vector of asset MOIC M:

$$N=a+\text{diag}(b)M$$ Eq. (18)

Table IV, below, illustrates the coefficients a and b for the five example asset classes 204, using an 8% interest rate. The coefficients vary for the five asset classes 204, due to different curve shapes for cash flow parameters in cash flow templates 210 for different asset classes 204:

TABLE IV

| | a | b |
|---|---|---|
| Buyout | −0.752 | 0.559 |
| Venture Capital | −0.777 | 0.549 |
| Real Estate Equity | −0.813 | 0.625 |
| Private Credit | −0.862 | 0.670 |
| Infrastructure | −0.841 | 0.613 |

The random variable M may be log-normal. The mean and covariance matrix of the random variable M may be given by the following formulas, below:

$$\mu_i^M = e^{\mu_i + \Sigma_{ii}/2}$$ Eq. (19)

$$\Sigma_{ij}^M = e^{\mu_i + \mu_j + (\Sigma_{ii} + \Sigma_{jj})/2}(e^{\Sigma_{ij}} - 1)$$ Eq. (20)

Using the formula above that determines NPV N in terms of M, the mean and covariance of the NPV N of the asset classes may be determined as follows:

$$\mu^N = a + \text{diag}(b)\mu^M$$ Eq. (21)

$$\Sigma^N = \text{diag}(b)\Sigma^M \text{diag}(b)$$ Eq. (22)

For a portfolio of commitments denoted by $\omega \in R^n$, the portfolio NPV mean and variance may be represented as follows:

$$(\mu^N)^T w$$ Eq. (23)

$$w^T \Sigma^N w$$ Eq. (24)

This is identical in form to standard Markowitz portfolio allocation, but with a mean vector and covariance matrix that depend on the interest rate, the asset class cash flow shapes, as well as the means, standard deviations, and correlations of log MOIC for different asset classes 204.

In some embodiments, the NPV of a normalized cash flow with a suitably chosen discount rate may be used as a surrogate for IRR for the asset classes 204 in portfolio 206. In other words, maximizing NPV may not be too far from maximizing IRR.

For conventional cash flows, NPV and IRR are almost unrelated, with just a few relationships between them, such as N(r)≤0 implying that IRR is no more than r. Also, for conventional cash flows, a fixed NPV may also lead to many different values of IRR, and vice versa. But for asset class cash flow shapes, as well as for portfolio 206 constructed from the asset class cash flow shapes, NPV and IRR may be more closely related. In some embodiments, the relationship between NPV and IRR may be a monotone relationship, which is closest when the NPV is near zero. The NPV at an interest rate equal to the IRR is zero.

Markowitz Optimization

In some embodiments, portfolio optimizer 106 may optimize portfolio 206 of alternative investments using Markowitz optimization. To optimize portfolio 206, portfolio optimizer 106 determines w or amount of investments from investment amount 202 that may be made in each asset class in asset classes 204. Portfolio optimizer 106 may optimize portfolio 206 as follows:

$$\text{maximize}(\mu^N)^T w - \gamma w^T \Sigma^N w$$

$$\text{subject to } w \in W, \qquad \text{Eq. (25)}$$

with variable $w \in R^n$, where W is the set of feasible portfolios and $\gamma > 0$ is the risk aversion parameter. A typical choice of W would include lower and upper limits on investment in each asset class and a total budget constraint:

$$w^{min} \leq w \leq w^{max}, 1^T w = B \qquad \text{Eq. (26)}$$

where B is the given budget (total to be committed), $w^{min}$ and $w^{max}$ are minimum and maximum amounts to be invested in each asset class in asset classes 204 and $w^{min} \geq 0$.

indices: i representing an asset class, s representing a period when the investment was made, and t representing a time period the payment is made.

In some embodiments, an n×S matrix w may represent commitments made to different asset classes 204 in different periods. Each row in matrix w represents commitments to a particular asset class made over different periods. Each column in matrix w represents the commitments across asset classes 204 made in a specific period. The sum of each row, given by the n-vector w1, is the total commitments made in each asset class in asset classes 204. The sum of each column, given by the S-vector $w^T 1$, is the total commitments made in each period s. Table V, below, illustrates a commitment plan for commitments in the five asset classes 204 (buyout, venture capital, real estate equity, private credit, and infrastructure) over 12 periods (S=12).

TABLE V

|  | Q1 | Q2 | Q3 | Q4 | Q5 | Q6 | Q7 | Q8 | Q9 | Q10 | Q11 | Q12 | total |
|---|---|---|---|---|---|---|---|---|---|---|---|---|---|
| Buyout | 0.085 | 0.034 | 0.016 | 0.016 | 0.002 | 0.000 | 0.000 | 0.010 | 0.013 | 0.012 | 0.051 | 0.060 | 0.300 |
| Venture Capital | 0.000 | 0.000 | 0.000 | 0.000 | 0.000 | 0.000 | 0.000 | 0.000 | 0.000 | 0.000 | 0.000 | 0.000 | 0.000 |
| Real Estate Equity | 0.000 | 0.029 | 0.045 | 0.045 | 0.008 | 0.001 | 0.001 | 0.038 | 0.047 | 0.048 | 0.023 | 0.015 | 0.300 |
| Private Credit | 0.000 | 0.000 | 0.000 | 0.000 | 0.000 | 0.000 | 0.000 | 0.000 | 0.000 | 0.000 | 0.000 | 0.000 | 0.000 |
| Infrastructure | 0.015 | 0.037 | 0.039 | 0.039 | 0.007 | 0.001 | 0.000 | 0.032 | 0.040 | 0.040 | 0.026 | 0.026 | 0.300 |
| total | 0.100 | 0.100 | 0.100 | 0.100 | 0.017 | 0.001 | 0.001 | 0.081 | 0.100 | 0.100 | 0.100 | 0.100 | 0.900 |

Figure 6:
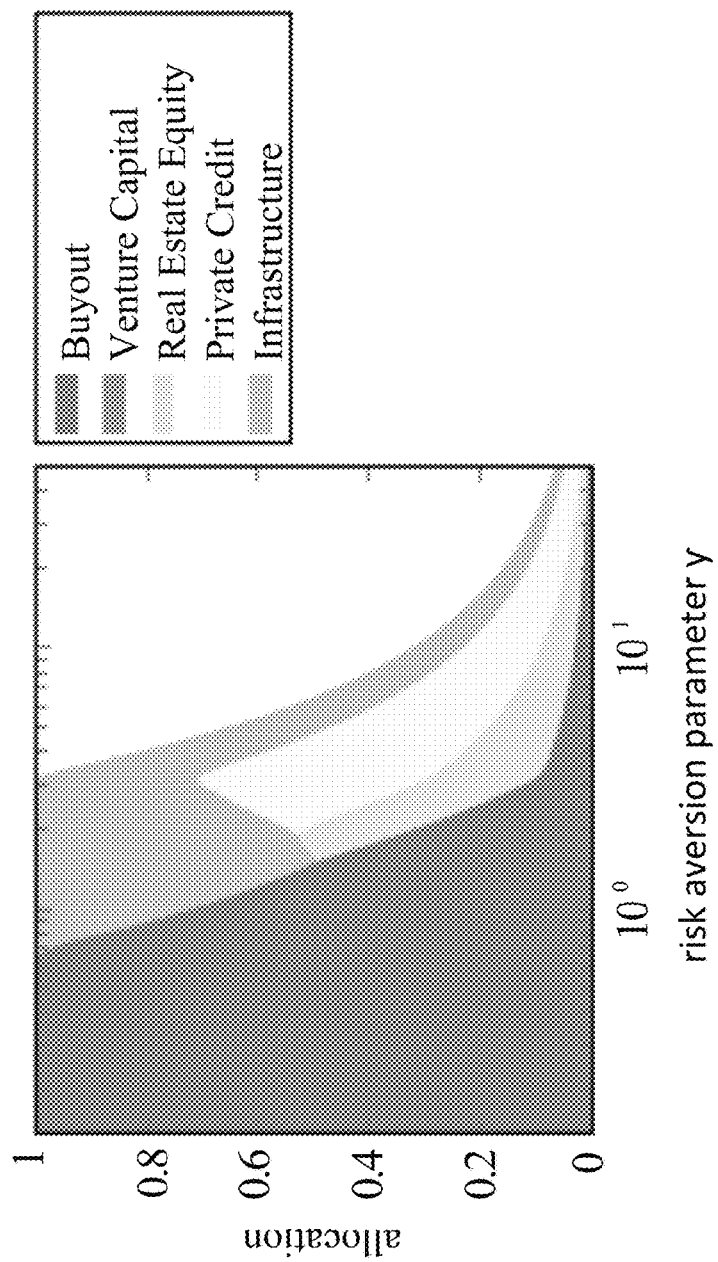
FIG. 6 illustrates a diagram of optimized portfolio allocations as a function of risk, according to some embodiments.

FIG. 6 is a diagram 600 of a graph illustrating cumulative portfolio allocation as a function of a risk aversion parameters, according to some embodiments. FIG. 6 illustrates a portfolio having five asset classes, including buyout, infrastructure, private credit, real estate equity, and venture capital classes. In FIG. 6, the risk aversion parameter $\gamma$ is varied, for the five asset classes, using the data parameters above, including a budget B=1, $w^{min}=0$, $w^{max}=1$, and interest rate r=0.025 (10% annual) to find the NPVs. At each value for the risk aversion parameter along the x-axis, different cumulative portfolio allocations may be made to portfolio 206. Notably, in this embodiment, portfolio optimizer 106 may elect to not invest in venture capital asset class.

Multi-Period Optimization

Portfolio optimizer 106 may optimize portfolio 206 over multiple periods. Optimization of portfolio 206 over multiple periods is also known as multi-period optimization. In the multi-period optimization, portfolio optimizer 106 optimizes a sequence of investments over some periods in some or all asset classes 204.

Portfolio optimizer 106 may receive cash flows for investments made in different periods. To simulate multi-period optimization, the cash flow model may be modified by shifting the cash flow for an investment made in period s to start at t=s. The cash flow for such an investment may be set to 0 for t<s. Portfolio optimizer 106 may then allocate commitments for each period s to different asset classes 204 and simulate cash flows for portfolio 206 over each period s.

Figure 7:
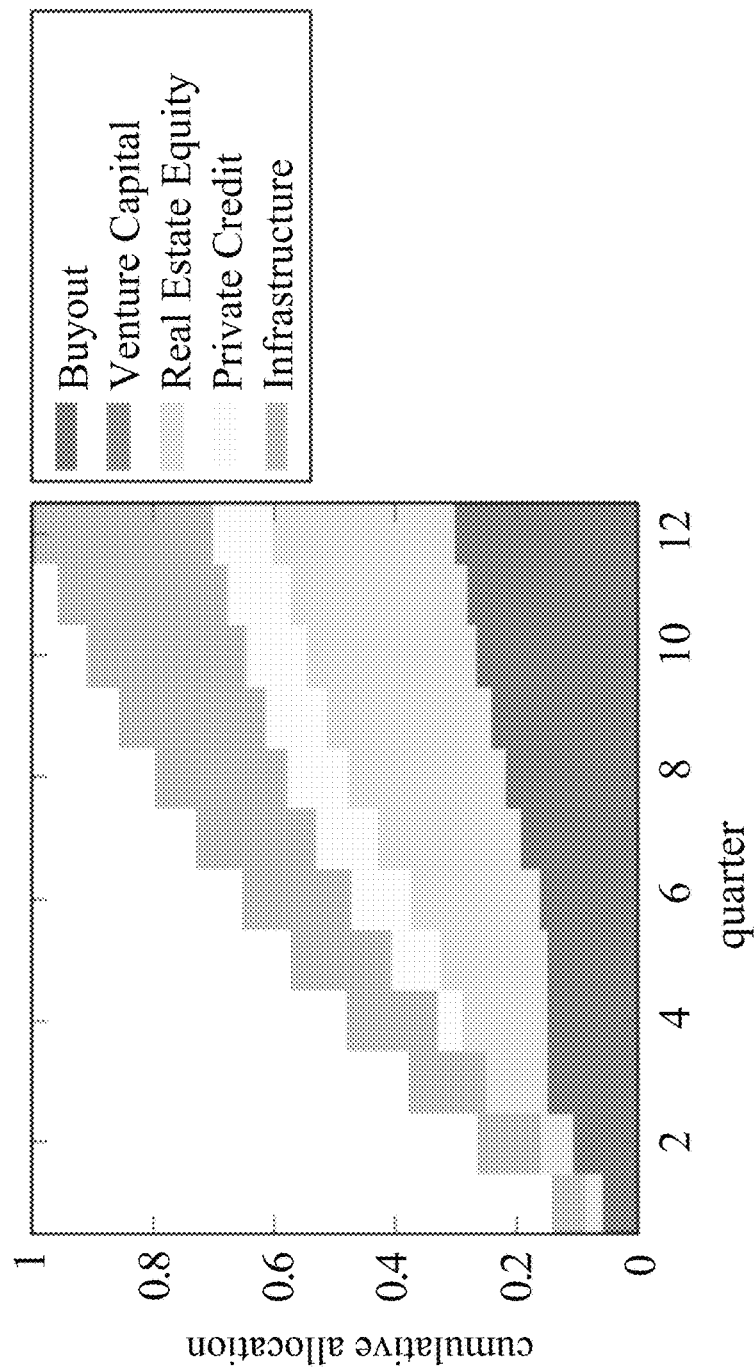
FIG. 7 illustrates a diagram of a cumulative investment plan for a portfolio, according to some embodiments.

In some embodiments, commitments made over multiple periods may be represented as $w_{is}$, i=1, . . . , n, and s=1, . . . , S, where $\omega_{is} \in R_+^n$ is the investment in asset class i in period s. Here S may be the last investment period. Cash flows and cumulative cash flows may be indexed using three FIG. 7 is a diagram 700 illustrating a graph of a cumulative commitment plan for a portfolio, according to some embodiments. The cumulative commitment plan in FIG. 7 spans twelve quarterly periods and is shown as a stack plot of cumulative commitments. The five asset classes 204 include buyout, venture capital, real estate equity, private credit, and infrastructure. In the commitment plan illustrated in FIG. 7, the portfolio optimizer 106 may not invest in the venture capital asset class, and begins investing in the private credit asset class in quarter 4 (Q4).

In some embodiments, portfolio optimizer 106 may determine a portfolio cash flow or cumulative cash flow for multi-period investments by determining the sum the cash flows from all nS investments. For example the cumulative portfolio cash flow may be determined as follows:

$$C_t = \sum_{s=1}^{S} \sum_{i=1}^{n} w_{is} C_{ist}, \ t = 1, \ldots, T \qquad \text{Eq. (27)}$$

where $C_{ist}$ is the cumulative normalized cash flow in period t associated with the commitment made in asset class i in period s.

The $M_{is}$ may denote a MOIC of investments made in asset class i in period s. In this case, M represents a matrix indexed by asset class i and by investment period s, or strung out as a vector with nS entries. The nS entries of M may be modeled as jointly log-normal. The log M (entry-wise) may be a Gaussian variable, with a mean and covariance matrix. The mean may be represented by His. The covariance may be an object indexed by four indices, discussed below.

The $\sigma_{is}$ represents a standard deviation of $M_{is}$.

The correlations may be given as follows:

$$\rho_{i,s,i's'}, i,i'=1, \ldots, n, s, s'=1, \ldots S \qquad \text{Eq. (28)}$$

The covariance matrix entries may be as follows:

$$\Sigma_{i,s,i',s'} = \sigma_{i,s}\sigma_{i',s'}\rho_{i,s,i's'} \quad \text{Eq. (29)}$$

where $\rho_{i,s,i',s'}$ may be a correlation of the log MOIC of asset class i, invested in period s, and the log MOIC of asset class i', invested in period s'. As illustrated in Eq. (29), there is a correlation among different asset classes 204 for the same period and also correlations among log MOICs for different vintage periods.

In some embodiments, to factor assets during a period, a factorized form for the correlations may be used. The factorized form may be determined as follows:

$$\rho_{i,s,i's} = \rho_{i,i'}^{class} \rho_{|s-s'|}^{vint} \quad \text{Eq. (30)}$$

where $\rho_{i,i'}^{class}$ may be a correlation of asset classes i and i', and $\rho_{\tau}^{vint}$ may be a correlation of any asset class between investments made $\tau$ periods apart. This results in an asset class correlation matrix, which is n×n, and the correlations across periods represented by a $\rho_1^{vint}, \ldots, \rho_{S-1}^{vint}$, where $\rho_0^{vint} = 1$.

In some embodiments, portfolio optimizer 106 may model the correlations across periods as follows:

$$\rho_{\tau}^{vint} = \max\left(1 - \frac{\tau}{T^{corr}}, 0\right) \quad \text{Eq. (31)}$$

where $T^{corr}$ is the number of periods over which investments are correlated. Thus, the correlation across time linearly decreases to zero. In this model, investments made $\tau$ periods apart overlap for $T^{corr}$ periods, with the performance in different periods independent of the others.

In some embodiments, portfolio optimizer 106 may optimize portfolio 206 using the Markowitz optimization over multiple periods. The optimization involves investments in a set of nS asset/vintage classes. Here, w may be an nS vector. Vector w may correspond to an entire investment schedule.

Portfolio optimizer 106 may also use the methods described above to find the mean and covariance of the NPV of these nS assets at a specified interest rate r. The mean of the NPV may be denoted as the nS-vector $\mu^N$ and the covariance of NPV may be denoted as symmetric nS×nS matrix $\Sigma^N$, respectively.

Similarly to the Markowitz optimization over a single period shown in Eq (25), the w for the Markowitz optimization over multiple periods may be represented as follows:

$$\text{maximize}(\mu^N)^T w - \gamma w^T \Sigma^N w$$

subject to $w \in W$ \quad Eq. (32)

The feasible set W (set of feasible portfolios) may contain the lower and upper limits on the individual weights as follows:

$$w_{is}^{min} \leq w \leq w_{is}^{max}, i=1,\ldots,n, s=1,\ldots,S \quad \text{Eq. (33)}$$

The lower and upper limits on the total amount invested in each period s, denoted $B_s$ (portions of investment amount 202 for period s), may be as follows:

$$B_s^{min} \leq B_s = \sum_{i=1}^{n} \omega_{is} \leq B_s^{max}, s = 1, \ldots, S \quad \text{Eq. (34)}$$

The lower and upper bounds on the total amount invested in each asset class i over all investment periods may be as follows:

$$\tilde{B}_i^{min} \leq \sum_{s=1}^{S} w_{is} \leq \tilde{B}_i^{max}, i = 1, \ldots, n \quad \text{Eq. (35)}$$

The total budget B (investment amount 202) may be as follows:

$$\sum_{i=1}^{n}\sum_{s=1}^{S} w_{is} = B \quad \text{Eq. (36)}$$

In Eqs. (33)-(35), w may be an n×S matrix. Further, in Eqs. (33)-(35), the individual weight limit $w_{is}^{max}$ may be compared to B/(nS), which is the weight values if equal investments are carried out in all periods s and over all asset classes 204. The limit on total invested per period, $B_s^{max}$ may be compared to B/S, the per-period investment if the budget was uniformly across the investment periods. The limit of total investment in asset classes, $\tilde{B}_i^{max}$ may be compared to B/n, which is the asset class investments if the asset class investments are all equal.

In some embodiments, the investments made during each period may be constrained on per-period budgets. The per-period budgets may be fixed to given values, which is the same as taking $B_s^{min} = B_s^{max}$. Both $B_s^{min}$ and $B_s^{max}$ may be denoted as $B_s$, such that $$\sum_{s=1}^{S} B_s = B.$$

Alternatively, the budget constrained may be dropped when per-period budgets are fixed.

In some embodiments, uniform commitments may be $B_s = B/S$, s=1, ..., S. In other embodiments, a variation of the commitments may take place as follows:

$$B_s = \theta_s B, s=1,\ldots,S \quad \text{Eq. (37)}$$

where $\theta_s \geq 0$ and $\Sigma_{s=1}^{S} \theta_s = 1$, so $\theta_s$ is a fraction of the total budget to invest in period s. The choice $$\theta_s = \frac{1}{S}$$

also generates uniform investing as described above.

In some embodiments, investments may be tilted or skewed using the equation below:

$$\theta_s = \frac{w^s}{w + w^2 + \ldots + w^S}, s = 1, \ldots, S \quad \text{Eq. (38)}$$

where w is a parameter greater than zero (w>0). For w<1, the investments are skewed toward early investment periods. For w>1, the investments are skewed toward later investment periods. For example, when $$w = (1/2)^{1/(S-1)},$$

an investment is twice as much in the initial period s=1 as in the last investment period s=S. In other words, the commitment or deployment of investment amount 202 is front loaded over multiple investment periods.

In some embodiments, for fixed per-period commitments, elementwise lower and upper bounds on the individual commitments may be imposed. The lower and upper bounds may be proportional to the per-period budget. The example, lower and upper bounds may be set as follows:

$$w_{is}^{min} = \eta_i^{min} B_s, w_{is}^{max} = \eta_i^{max} B_s,$$

$$i=1,\ldots,n, s=1,\ldots,S \qquad \text{Eq. (39)}$$

where $\eta_i^{min}$ and $\eta_i^{max}$ may be interpreted respectively as the minimum and maximum fraction of the per-period budget that is committed to asset class i in each period s.

The portfolio optimizer 106 solves the Markowitz problem of Eq. (32) and generates w, that is a plan for investing in the asset classes i=1, ..., n over periods s=1, ..., S. The solution takes into account correlations between asset classes 204, correlations across time periods, and shapes of the cash flows associated with the commitments to different asset classes 204 made during different periods s.

Figure 8A:
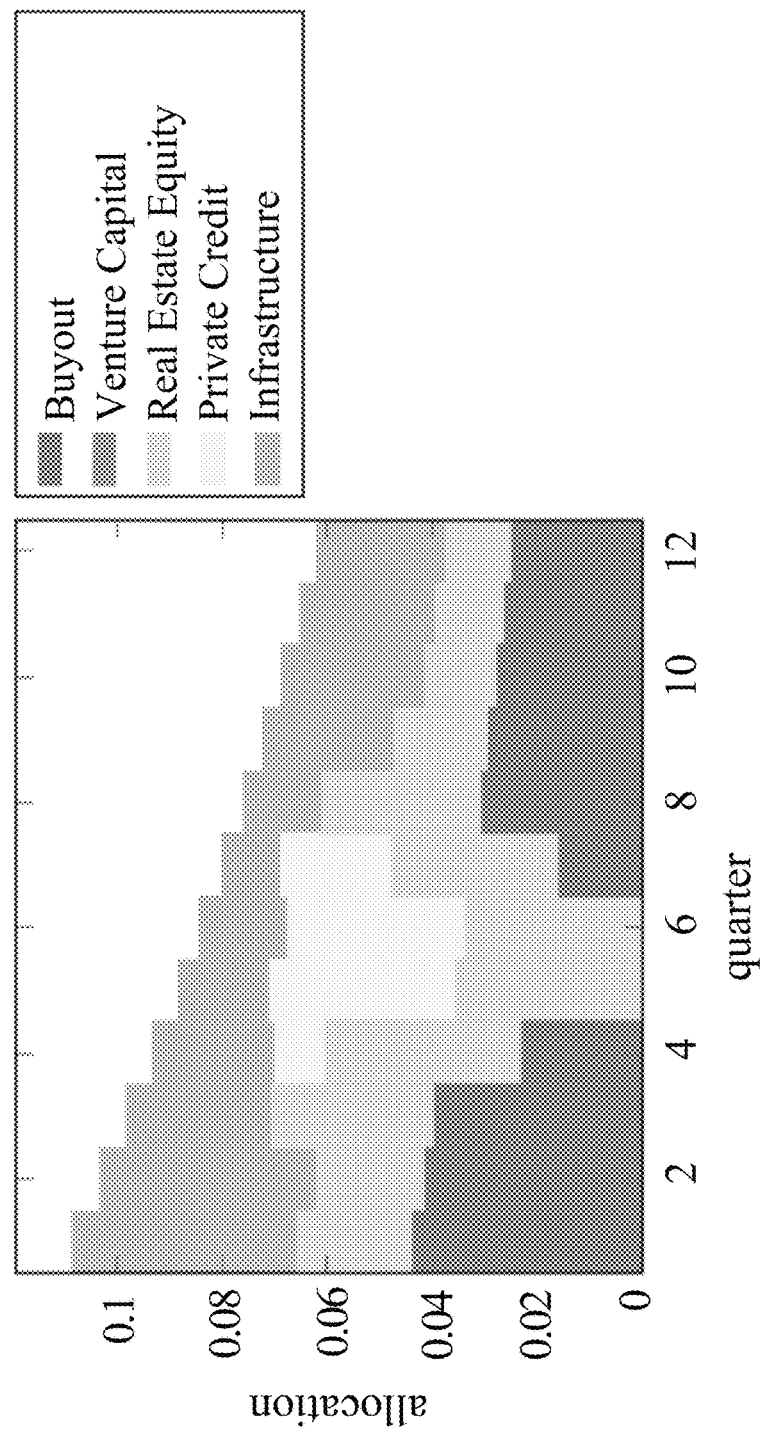
FIGS. 8A-B and 9A-B illustrate diagrams of an investment plan and a cumulative investment plan for a portfolio, according to some embodiments.
Figure 8B:
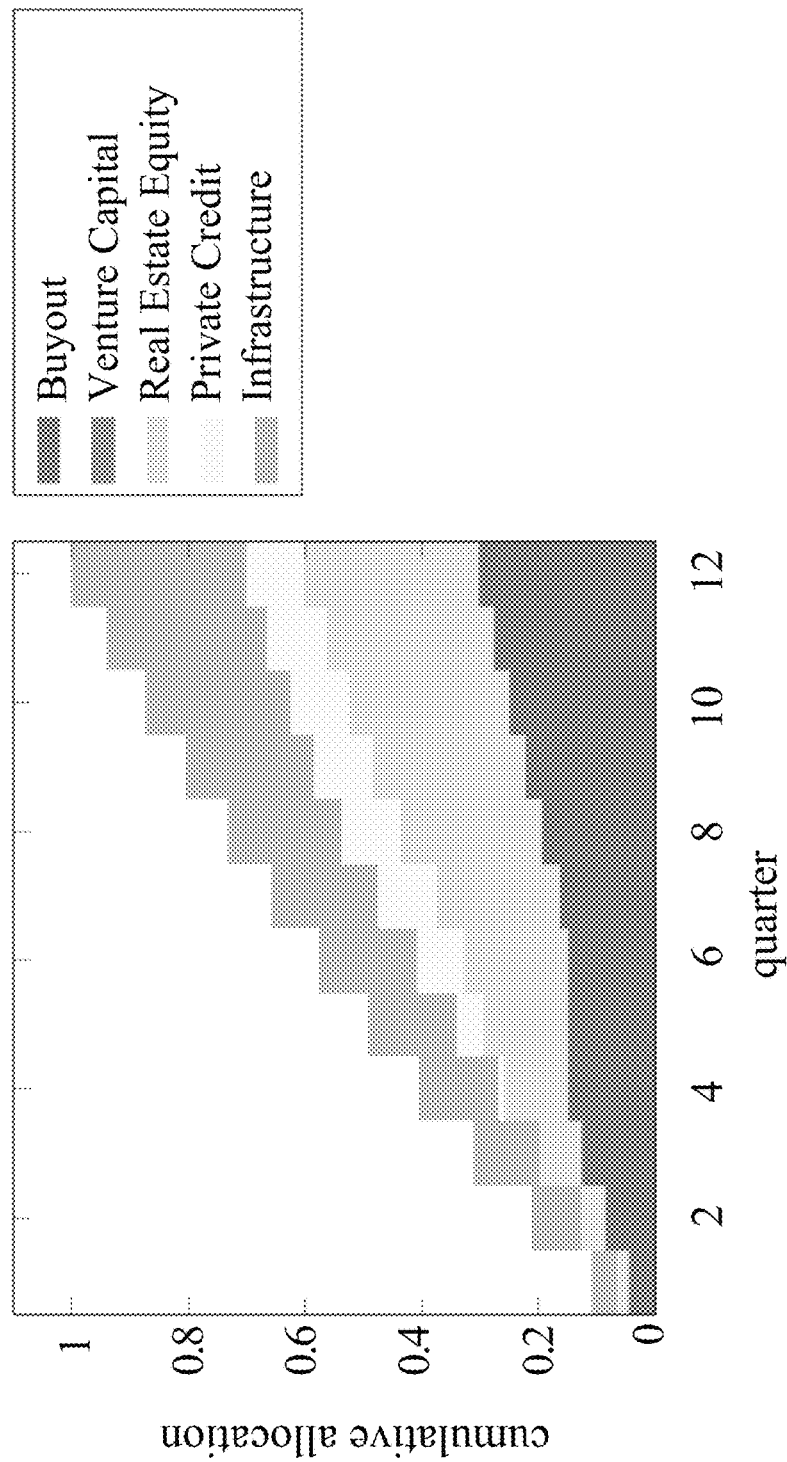

Consider an example with the five asset classes 204 discussed above, interest rate r=0.025 (which corresponds to 10% annual), S=12 investments periods, and time correlation $T^{corr}$=5. For a total budget B=1, per-period budget constraints may be w=0.95, which means that in the investment plans, the last period budget is around 57% as much as the first period budget. When the asset class limit is $B_i^{max}$=0.3, no more than 30% of investments can be invested in any one asset class i. The elementwise limits may be set to $\eta_i^{max}$=0.40, which means that in any one period, investments cannot be concentrated more than 40% in any one asset class i. Further, the risk aversion value may be set to $\gamma$=2.5, which yields an expected NPV=0.37, standard deviation of NPV=0.21, a medium IRR=12.08%, and 10th percentile IRR=5.59%. FIG. 8A is a diagram 800A illustrating a graph of a per-period investment plan for portfolio that allocates assets to asset classes 204 during each period and using the parameters discussed above. FIG. 8B is a diagram 800B of a graph illustrating a cumulative investment plan of the portfolio in FIG. 8A. FIGS. 8A and 8B illustrate that portfolio optimizer 106 simulates portfolio 206 with investment allocations to four out of five available asset classes 204 over 12 investment periods.

Handling Previous Investments

As discussed above, portfolio optimizer 106 may generate an investment plan that allocates investments to each asset class i in each period s. The investment plan generally may start at period s=1 and end at period s=S. In some instances, the investment plan may begin at period s, where s>1. This case assumes that some investments have already been made in previous periods t=1, ..., s−1. To handle this scenario, portfolio optimizer 106 may constrain the investments made in previous periods to be the actual investments made, and then solve the Markowitz problem in Eq (32). This may be accomplished by adding equality constraints, or by setting the lower and upper bounds on $w_{is}$ to be equal to the previous investments. The portfolio optimizer 106 may take into account the future effects of these previous investments in generating investment plan for the remainder of the investment period t=s, ..., S.

In some embodiments, portfolio optimizer 106 may constrain the previous investments to be equal to the actual values. For example, the actual investments in previous periods may violate a limit on the per-period budget or on the individual investments in the asset classes 204. To handle this scenario, portfolio optimizer 106 may ignore the per-period and individual investment limits for t=1, ..., s−1 because these investments have already been made. In another example, the total of previous investments in an asset class i may exceed the maximum allowable investment in asset class i. In this scenario, portfolio optimizer 106 may increase the maximum investment limit to equal the amount previously invested, which bars further investments in asset class i. The per-period budget based on the original total budget minus the actual total amount invested in the previous periods may also be adjusted.

Figure 9A:
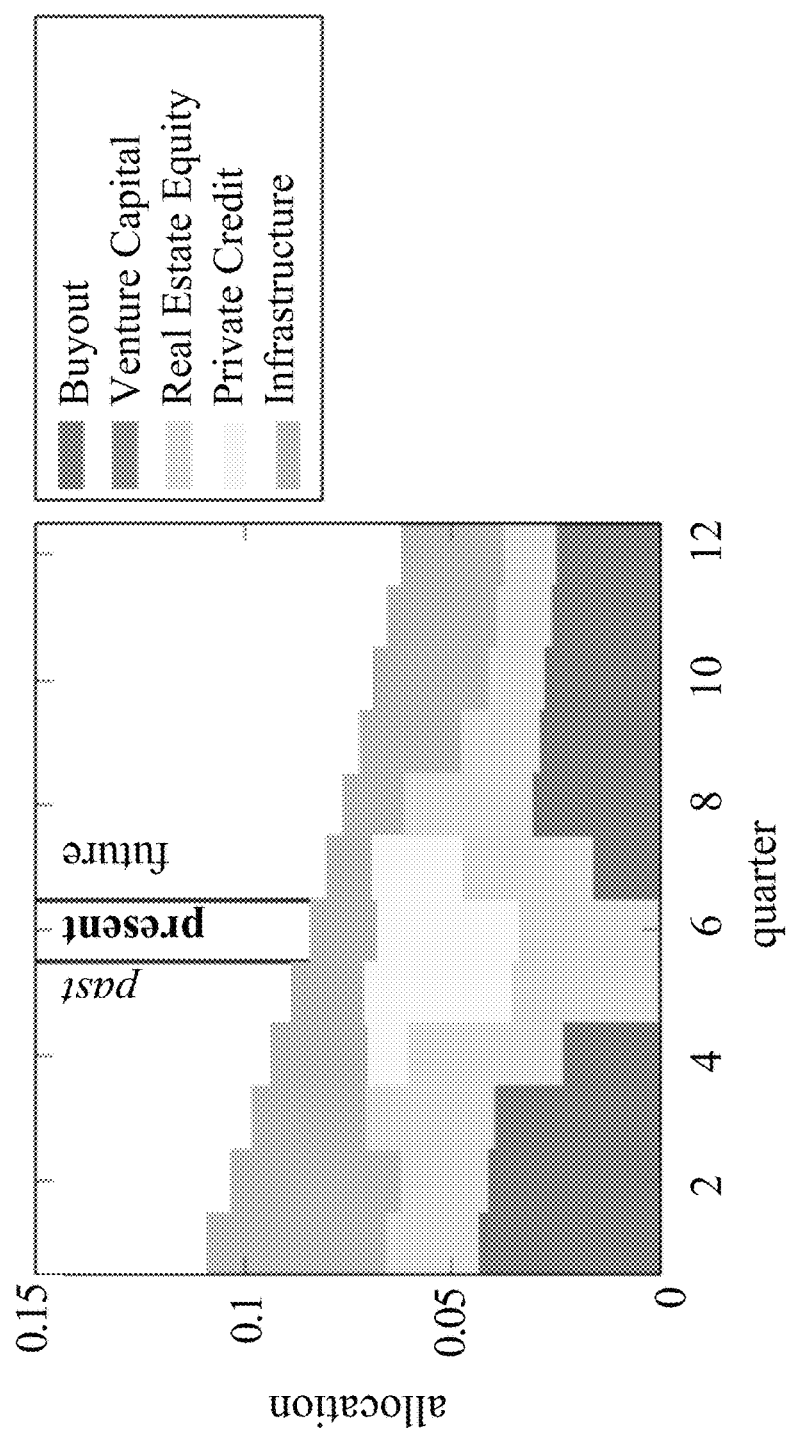
Figure 9B:
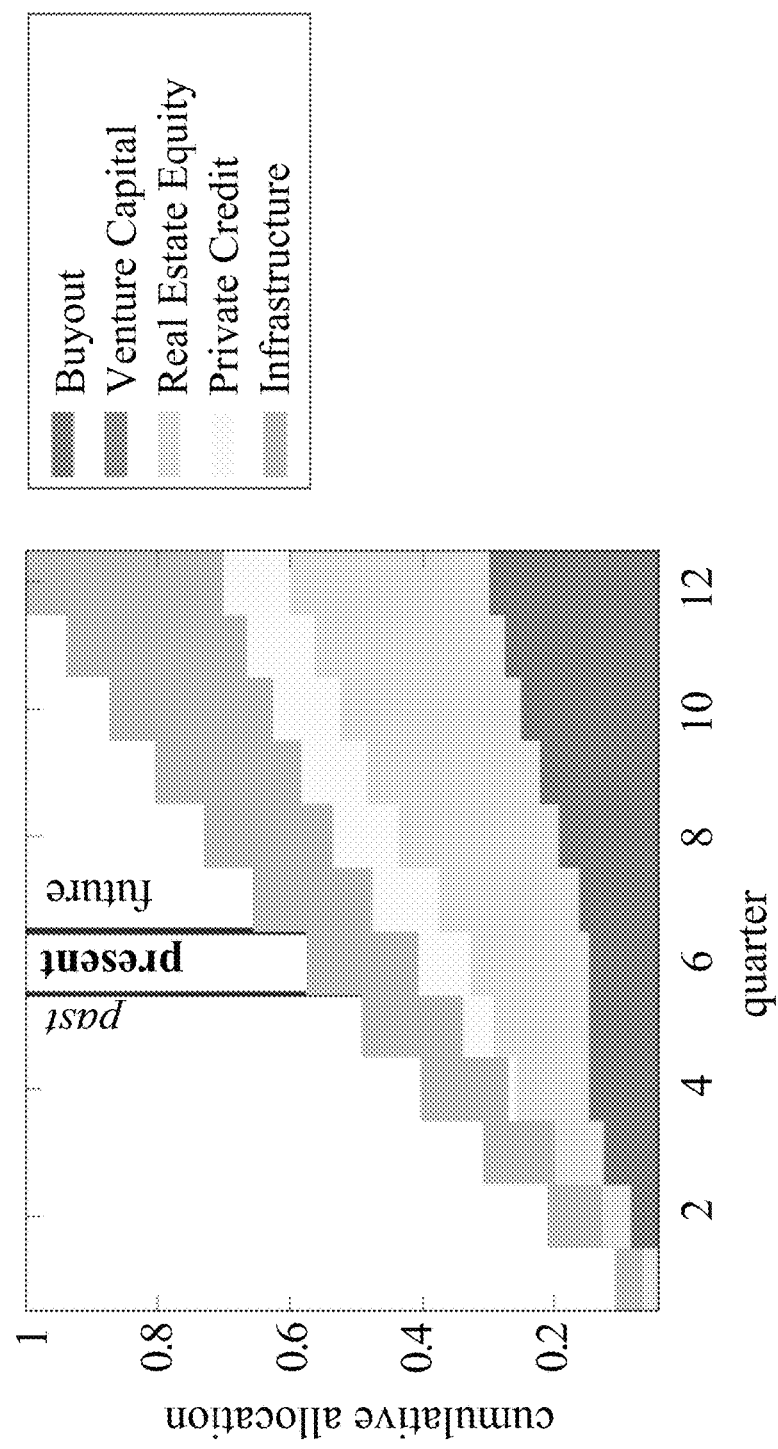

FIGS. 9A and 9B are diagrams 900A and 900B illustrate graphs of a per-period investment plan and a cumulative investment plan for a portfolio, according to some embodiments. For example, portfolio optimizer 106 may generate a per-period investment plan and a cumulative investment portfolio for portfolio 206 after initial commitments were already made, according to some embodiments. In FIGS. 9A and 9B, portfolio optimizer 106 generates an investment plan for investing in periods t=5, ..., 12 assuming that for periods t=1, ..., 5 an amount B/(nS)=0.01667 has already been committed to each asset class i in asset classes 204. FIGS. 9A and 9B illustrate the investment with the present period t=6. The vertical lines delineate the past investments periods t=1, ..., 5, the present investment periods t=6, and the future investments periods t=7, ..., 12. A comparison between the graphs in diagrams 900A and 900B, and diagrams 800A and 800B illustrates a change in investment plan for periods t=6, ..., 12 in light of commitments made in periods t=1, ..., 5.

Model Predictive Control

In some embodiments, portfolio optimizer 106 may use model predictive control (MPC) method that leverages the multi-period optimization described above to obtain an investment policy 208. Policy 208 may suggest investments to be made in periods t=1, ..., S. In each period t, portfolio optimizer 106 suggests investments $w_t$ to be made in that time period, taking into account the actual previous investments made, as well as updated forecasts of asset class returns. The investment plan that portfolio optimizer 106 obtains by solving the Markowitz problem in Eq. (32) may be considered an open-loop policy, i.e., a prescription for what to invest in is fixed once and for all, and may not change. To generate an investment plan, portfolio optimizer 106 may solve the Markowitz problem in Eq. (32) to determine w, which is a plan for investing. The aim is to invest across asset classes 204 in period t=1 using the suggested amount $w_1$. However, in some embodiments, due to availability of potential investments, entire amount $w_1$ may not be invested in t=1. At period t=2, the amount $w_1$ may be fixed to be equal to the actual investments made in period t=1, not the amount the portfolio optimizer 106 suggested. Portfolio optimizer 106 may solve the big Markowitz problem again with the $w_1$ being what was actually invested. The investments in the plan during period t=2 may be in the target amounts $\omega_2$. Once again, the investments may not be the exact amount as the target amounts $\omega_2$. This process may be repeated for each investment period, until t=S, when all investments have been made, or until the total investment period ends without all investments having been made.

By using the MPC method, portfolio optimizer 106 may adapt to the uncertainty in the actual investments made, versus what the policy 208 suggests. Portfolio optimizer 106 may also adapt to changes in the budget, for example, when the total amount invested in one period is less (or more) than planned, leaving more (or less) available for future investing. Adaptation may be useful in some cases. For example, distributions may be reinvested during the investment period (instead of passing distributions through to the client) by simply increasing the per-period budget $B_t$ by the distributions received over the previous period s−1.

In some embodiments, investments may also be adapted in response to economic indicators or other features that have changed and have had an impact on investments.

An example below, illustrates the portfolio optimizer 106 using the MPC method. Suppose portfolio optimizer 106 generates an investment plan as shown in Table VI below.

Figure 10A:
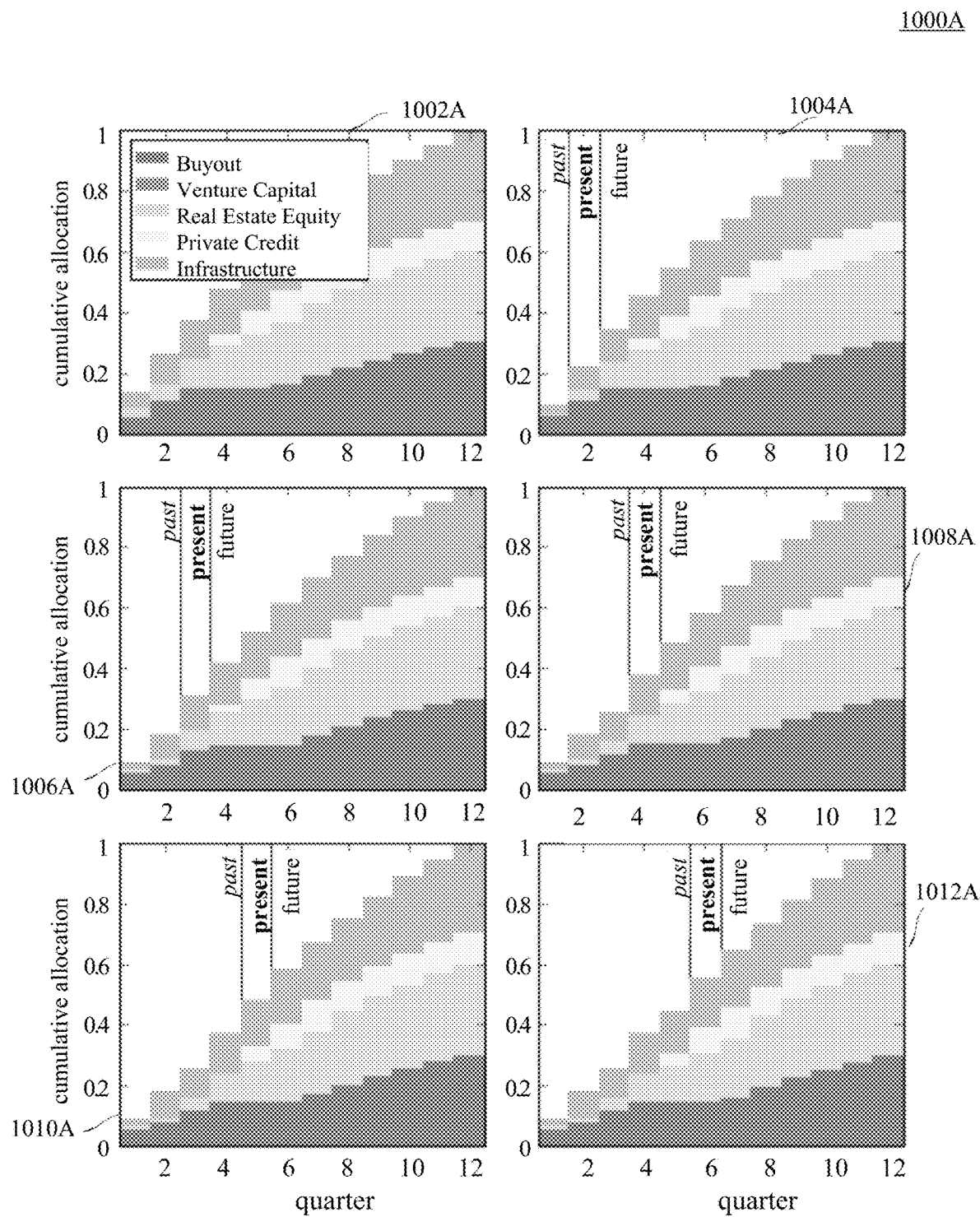
FIGS. 10A and 10B illustrate diagrams of cumulative investment plans and investment plans for a portfolio implemented with a model predictive control (MPC) method, according to some embodiments.
Figure 10B:
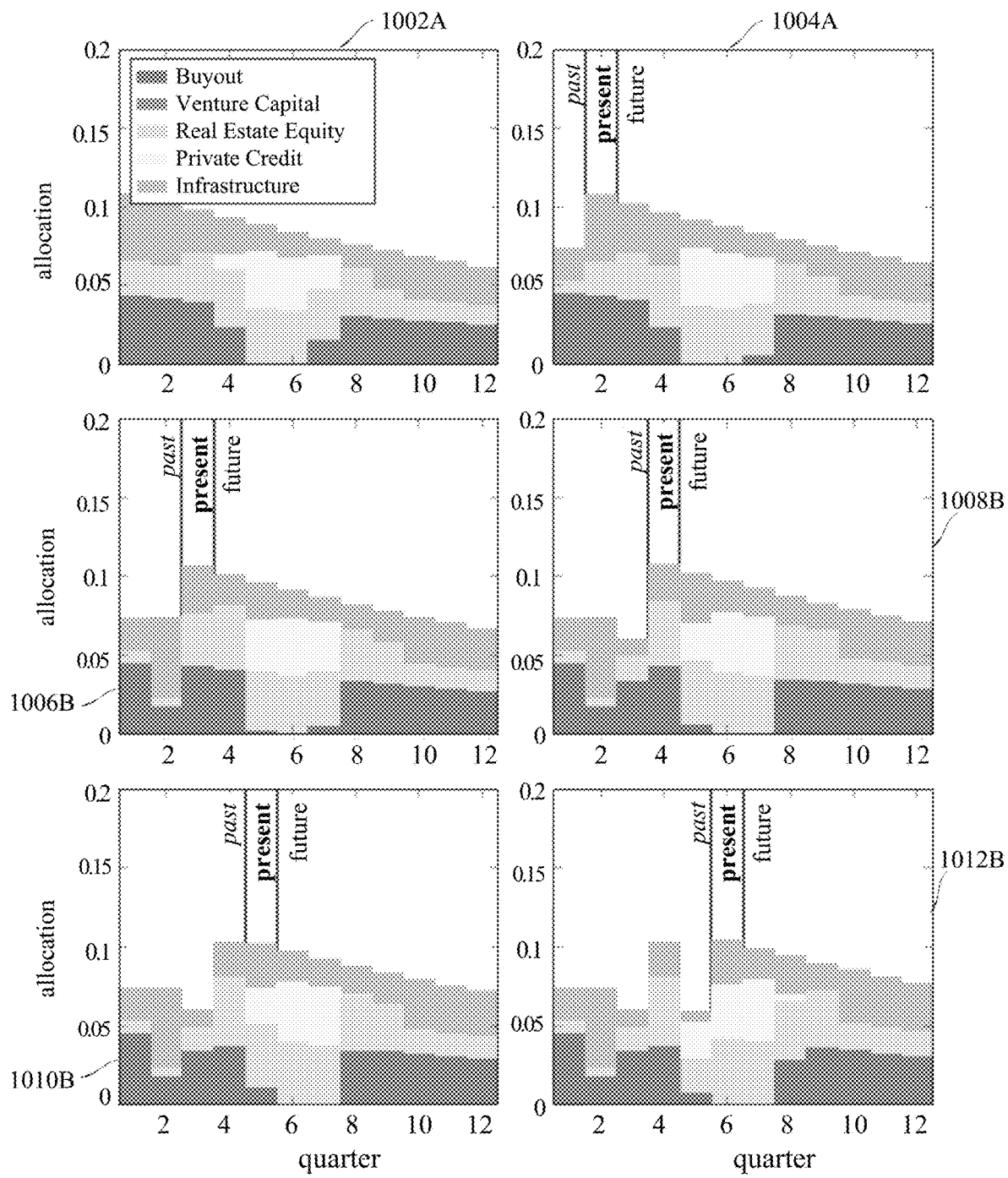

Tables VI-VIII illustrate that portfolio optimizer 106 may adapt to investments that were actually made rather than the investments that were proposed over the investment period. FIG. 10A illustrates a diagram 1000A of graphs showing cumulative investment plans for a portfolio implemented with a model predictive control method (MPC), according to some embodiments. Graph 1002A illustrates an investment plan without an MPC method. Graphs 1004A-1012A illustrate an investment plan that is adjusted using the MPC method by the actual investment rather than predictive investment at each period from Q1 to Q6. FIG. 10B illustrates a diagram of graphs showing per-period investment

TABLE VI

|  | Q1 | Q2 | Q3 | Q4 | Q5 | Q6 | Q7 | Q8 | Q9 | Q10 | Q11 | Q12 | total |
|---|---|---|---|---|---|---|---|---|---|---|---|---|---|
| Buyout | 0.056 | 0.050 | 0.043 | 0.000 | 0.000 | 0.012 | 0.030 | 0.027 | 0.024 | 0.022 | 0.019 | 0.017 | 0.300 |
| Venture Capital | 0.000 | 0.000 | 0.000 | 0.000 | 0.000 | 0.000 | 0.000 | 0.000 | 0.000 | 0.000 | 0.000 | 0.000 | 0.000 |
| Real Estate Equity | 0.028 | 0.026 | 0.045 | 0.041 | 0.037 | 0.033 | 0.030 | 0.020 | 0.012 | 0.011 | 0.010 | 0.009 | 0.300 |
| Private Credit | 0.000 | 0.000 | 0.000 | 0.041 | 0.037 | 0.023 | 0.000 | 0.000 | 0.000 | 0.000 | 0.000 | 0.000 | 0.100 |
| Infrastructure | 0.056 | 0.049 | 0.024 | 0.020 | 0.018 | 0.015 | 0.015 | 0.020 | 0.024 | 0.022 | 0.019 | 0.017 | 0.300 |
| total | 0.139 | 0.125 | 0.113 | 0.102 | 0.091 | 0.082 | 0.074 | 0.067 | 0.060 | 0.054 | 0.049 | 0.044 | 1.000 |

The column labeled Q1 in Table VI illustrates the target investment for period Q1. Table VII illustrates an investment plan portfolio optimizer 106 generates for period Q2. The column labeled Q1 in Table VII illustrates the actual investments that were made in period Q1, which are different from the investments proposed for period Q1 in Table VI.

plans generated with portfolio optimizer 106 using the MPC method. Graph 1002B illustrates an investment plan for each period without an MPC method. Graphs 1004B-1012B illustrate an investment plan that is adjusted using the MPC method by the actual investment rather than predictive investment at each period from Q1 to Q6. As illustrated in

TABLE VII

|  | Q1 | Q2 | Q3 | Q4 | Q5 | Q6 | Q7 | Q8 | Q9 | Q10 | Q11 | Q12 | total |
|---|---|---|---|---|---|---|---|---|---|---|---|---|---|
| Buyout | *0.057* | 0.053 | 0.043 | 0.000 | 0.000 | 0.001 | 0.031 | 0.028 | 0.025 | 0.023 | 0.020 | 0.018 | 0.300 |
| Venture Capital | *0.000* | 0.000 | 0.000 | 0.000 | 0.000 | 0.000 | 0.000 | 0.000 | 0.000 | 0.000 | 0.000 | 0.000 | 0.000 |
| Real Estate Equity | *0.010* | 0.026 | 0.046 | 0.043 | 0.039 | 0.035 | 0.031 | 0.027 | 0.013 | 0.011 | 0.010 | 0.009 | 0.300 |
| Private Credit | *0.000* | 0.000 | 0.000 | 0.034 | 0.039 | 0.027 | 0.000 | 0.000 | 0.000 | 0.000 | 0.000 | 0.000 | 0.100 |
| Infrastructure | *0.027* | 0.053 | 0.030 | 0.030 | 0.019 | 0.024 | 0.016 | 0.015 | 0.025 | 0.023 | 0.020 | 0.018 | 0.300 |
| total | *0.094* | 0.132 | 0.119 | 0.107 | 0.096 | 0.087 | 0.078 | 0.070 | 0.063 | 0.057 | 0.051 | 0.046 | 1.000 |

Table VIII, below, illustrates the investment plan portfolio optimizer 106 generates for period Q3. In Table VIII the columns labeled Q1 and Q2 are in italics and indicate the actual investments that were made during periods Q1 and Q2 and not the proposed investments shown in column Q1 in Table VI and column Q2 in Table VII.

FIGS. 10A and 10B, the MPC method adjusts the amount of investment allocations to different asset classes 204 at each period based on the actual investments made during the previous periods.

In some embodiments, portfolio optimizer 106 may simulate policy 208 that is an MPC policy using a statistical

TABLE VIII

|  | Q1 | Q2 | Q3 | Q4 | Q5 | Q6 | Q7 | Q8 | Q9 | Q10 | Q11 | Q12 | total |
|---|---|---|---|---|---|---|---|---|---|---|---|---|---|
| Buyout | *0.057* | *0.021* | 0.050 | 0.018 | 0.000 | 0.000 | 0.033 | 0.030 | 0.027 | 0.024 | 0.022 | 0.019 | 0.300 |
| Venture Capital | *0.000* | *0.000* | 0.000 | 0.000 | 0.000 | 0.000 | 0.000 | 0.000 | 0.000 | 0.000 | 0.000 | 0.000 | 0.000 |
| Real Estate Equity | *0.010* | *0.007* | 0.050 | 0.045 | 0.041 | 0.037 | 0.033 | 0.030 | 0.016 | 0.012 | 0.011 | 0.010 | 0.300 |
| Private Credit | *0.000* | *0.000* | 0.000 | 0.023 | 0.041 | 0.037 | 0.000 | 0.000 | 0.000 | 0.000 | 0.000 | 0.000 | 0.100 |
| Infrastructure | *0.027* | *0.062* | 0.025 | 0.027 | 0.020 | 0.018 | 0.016 | 0.015 | 0.024 | 0.024 | 0.022 | 0.019 | 0.300 |
| total | *0.094* | *0.090* | 0.125 | 0.133 | 0.101 | 0.091 | 0.082 | 0.074 | 0.067 | 0.060 | 0.054 | 0.049 | 1.000 | model. The statistical model may illustrate how actual investments differ from recommendations made by the MPC policy. For example, actual investments made may be random and vary over a range above and below the planned investments. During the simulation, portfolio optimizer 106 may step through periods t=1, . . . , S updating the proposed investments with actual investment made, then solve the MPC problem to obtain the next recommendation for proposed investments during the next period. Once period t=S is reached, the investments become fixed. The cash flows of portfolio 206 are then simulated until portfolio reaches period t=T. Portfolio optimizer 106 may repeat the simulation a number of times to achieve a predefined IRR.

Cash Flow Shaping with Liquid Investments

In some embodiments, portfolio optimizer 106 may receive investment amount 202 that is a single contribution for period t=1, i.e., lump funding. In this case, there may be one initial transfer of funds, that is a one-time investment amount 202, instead of waiting for capital calls to be passed through. The investment amount 202 may be invested in a liquid account or a cash account, and used to fund the capital calls during various periods t by portions of investment amount 202. Portions of investment amounts 202 may be drawn from the account until all of the investment amount 202 is called. Once all capital calls have been paid, the remaining funds in the liquid account may be returned as a distribution.

At each period t, portfolio optimizer 106 may track the total future un-called commitments and liquid account value. Based on these two values, the future per-period budgets may be adjusted, as well as the risk level of the liquid account. The risk may be adjusted so that the probability of un-called commitments exceeding the value of the liquid (or cash) account is less than a predefined threshold.

The liquid (or cash) account balance may vary based on the investment returns and the capital calls that have occurred. This fluctuation may be handled using the MPC method by adjusting the per-period budget $B_t$ to be proportional to the total current value of the liquid account, minus the un-called commitments, divided by the remaining investment periods S−t+1. In the final investment period t=S, the budget may be set to be equal to the whole value of the liquid account. Thus during each period, the per-period budget is adjusted, depending on the current value of the liquid account and un-called commitments.

Several methods may be used to set the risk level of the liquid (or cash) account in each period. One method keeps an amount equal to the un-called commitments in a cash account. The remainder of the liquid account value is invested in a higher risk, higher return portfolio. Another method selects a portfolio for which the probability of an investment return that renders the liquid account value less than the un-called commitments is less than a predefined threshold. After the last capital call comes in and is paid, the residual amount may be distributed in the liquid account as a distribution.

In another embodiment of cash flow shaping, distributions from cash flows in portfolio 206 may be reinvested during the investment phase. In this case, distributions are reinvested during the investment period, instead of being passing to the investor. The distributions may be collected into a liquid (or cash) account. The account may be used to dynamically increase the per-period budget $B_s$ based on the account value. The liquid account may be used to increase the next period's budget. In this case, the capital calls are funded from two sources, the investor during each period t and the liquid account, which is funded from previous distributions.

After the investment period t=S, the distributions are passed through to the investor. This method of re-investing distributions can be combined with lump-sum funding. In this case, the liquid account value is decreased by the realized capital calls and increased by the client's original funding, as well as realized distributions, and investment return on the liquid portfolio.

In some embodiments, portfolio optimizer 106 may include a user interface 212. User interface 212 may display graphs of cumulative investment allocations in asset classes 204, generated by portfolio optimizer 106, according to a corresponding risk and corresponding per-period investment allocations in asset classes 204. Additionally, user interface 212 may display graphs, generated by portfolio optimizer 106, that simulate cash flows that are associated with the cumulative investment allocations and the corresponding risk.

In some embodiment, the diagrams of the cumulative investment allocations, per-period investment allocations, and cash flows may be interrelated, such that a change in one diagram may generate instructions that automatically propagate changes to other diagrams in real time.

Figure 11A:
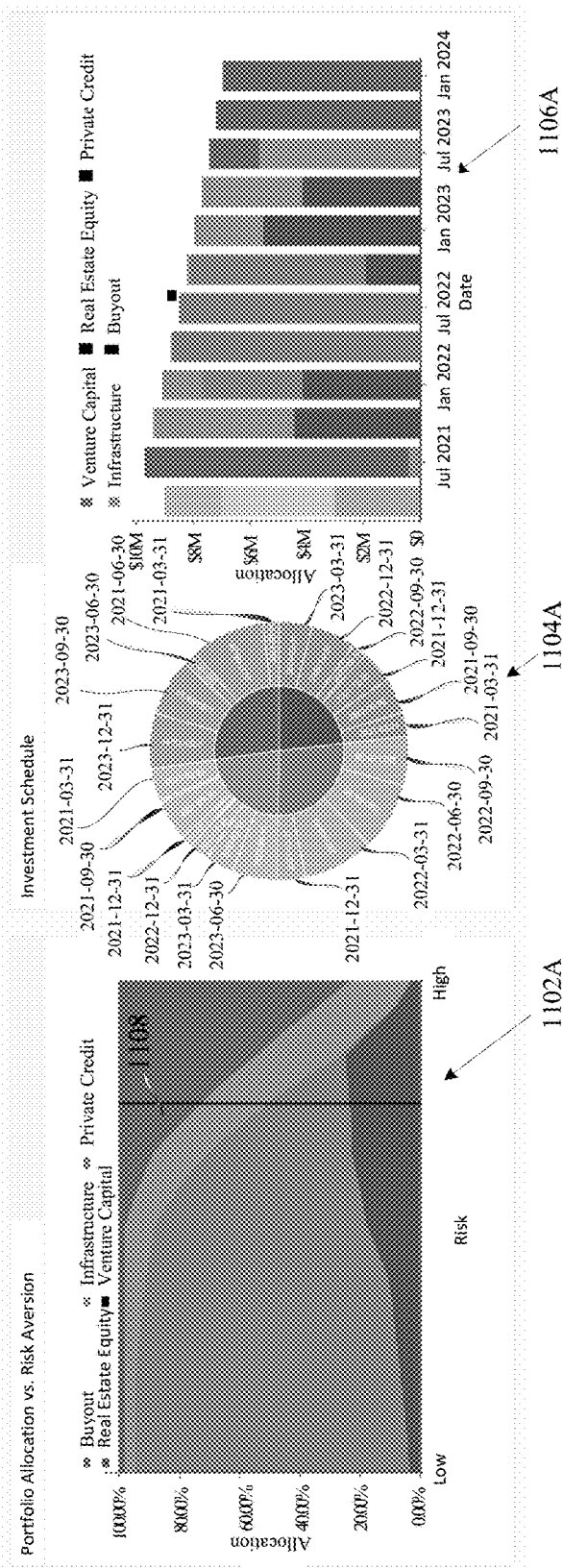
FIGS. 11A and 11B illustrate diagrams of a user interface with portfolio allocations as a function of risk diagram and investment schedule diagrams, according to some embodiments.
Figure 11B:
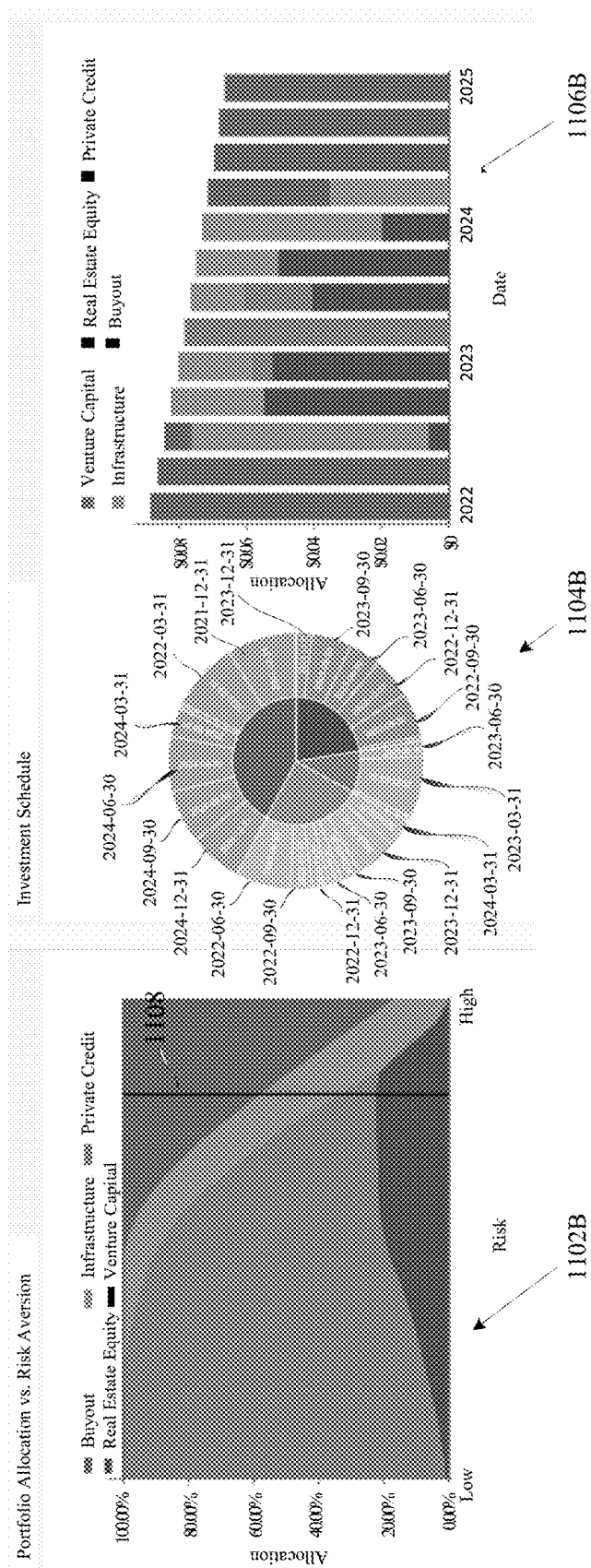

FIGS. 11A and 11B are diagrams 1100A and 1100B of a user interface, according to some embodiments. Portfolio optimizer 106 may generate one or more user interfaces that includes graphs such as a cumulative investment allocation for a portfolio verses risk aversion graph 1102A, and investment schedule graphs 1104A and 1106A. Graph 1002A may display cumulative investment allocations or a cumulative investment plans for portfolio 206 that corresponds to different risk aversion values. The risk values may be identified along the x-axis of graph 1102A. Investment schedule graphs 1104A and 1106A may display per-period investment allocation in asset classes 204 for the corresponding cumulative investment allocation plan shown in graph 1102A. Graphs 1102A-1106A or the user interfaces that display graphs 1102A-1106A may be interrelated, such that movement of a computer generated marker, e.g. a cursor, in or over one graph causes portfolio optimizer 106 to initiate computing instructions that cause changes in the other graph(s) to occur in response to the movement of the marker.

Suppose cumulative portfolio investment allocation verses risk aversion graph 1102A illustrates a relationship between a risk value and cumulative investment allocation into various asset classes 204 in portfolio 206 over a time period S. In graph 1102A, the asset classes 204 are buyout, infrastructure, private credit, real estate equity, and venture capital classes. The higher risk value identified along the x-axis of graph 1102A indicates an allocation of asset classes 204 to portfolio 206 that results in higher cash flows than a lower risk value. A risk line 1108 may indicate a risk value and corresponding cumulative investment allocations in asset classes 204 that correspond to a risk value associated with risk line 1108. Risk line 1108 may be a computer generated marker. Risk line 1108 may be moved using, e.g., a cursor coupled to an input device, from left to right and vice versa along an x-axis to illustrate the cumulative investment allocations to asset classes 204 for different risk values. Graph 1102B in FIG. 11B illustrates a cumulative portfolio investment allocation verses risk aversion graph with the risk line 1108 moved to the right and indicating a cumulative portfolio investment allocation for a higher risk value as compared to the risk value in graph 1102A of FIG. 11A.

Graph 1104A illustrates a cumulative and per-period investment allocation in asset classes 204 associated with a risk value indicated using risk line 1108. By examining graph 1102A, a user may visually recognize that the cumulative investment allocations in the private credit asset class and the buyout asset class may be approximately the same. Similarly the cumulative investment allocations in the infrastructure asset class and the real estate equity asset class are approximately the same.

Each asset class 204 in graph 1104A is further divided into sections. The sections correspond to per-period investment allocations and may indicate dates associated with different investment periods. The dates indicate an investment schedule during which the investment allocations that may be made in corresponding asset classes 204 during the designated investment periods.

As discussed above, the cumulative portfolio investment allocation verses risk aversion graph 1102A and the investment schedule graph 1104A may be interrelated. Accordingly, in response to a movement of the risk line 1108 along the horizontal axis to a different risk value, the portions of different asset classes 204 illustrated in the investment schedule graph 1104A and the sections indicating the investment periods may change in real-time and in response to the movement of risk line 1108 to reflect the new location of the risk line 1108. For example, suppose the risk line 1108 is moved to the right to a location illustrated in graph 1102B. In response to the new risk value associated with a new location of risk line 1108, graph 1104B may illustrate a new cumulative and per period investment allocation in asset classes 204. Graph 1104B illustrates the cumulative and per-period investment allocations that correspond to a higher risk value. As illustrated in graph 1104B, at the higher risk value, the investment allocations in the real estate equity asset class and the infrastructure asset class may be approximately the same. Using the user interface, a user may visually recognize that cumulative investment allocation in the buyout asset class may be approximately one third of investment of other asset classes. The user may also visually recognize that the investment in a private credit asset class decreases for the increased values of risk.

As the risk line 1108 continuously moves to different locations along the x-axis in graphs 1102A-B, the cumulative and per-period asset class allocations in the investment schedule graphs 1104A-B may change in real-time to reflect different values associated with the locations of the risk line 1108. The cumulative and per-period asset class allocations in graphs 1104A-B may stop changing once the risk line 1108 in graphs 1102A-B stops moving along the x-axis. For example, as the risk line 1108 moves from a location shown in graph 1102A to a location shown in graph 1102B, the cumulative investment allocation of asset classes 204 continuously changes. This causes the cumulative and per-period investment allocation of asset classes 204 shown in investment schedule graph 1104A to continuously change in real-time. The graph 1104A then displays the continuous changes to cumulative and per-period investment allocation of asset classes 204 as the risk line 1108 travels to the location shown in graph 1102B. The investment schedule graph 1104B stops changing and has a state shown in investment schedule graph 1104B once the risk line 1108 reaches the location in graph 1102B.

Investment schedule graph 1106A illustrates a per period investment in asset classes 204 associated with a risk value indicated using risk line 1108 over a thirteen time periods (S=13). By examining graph 1106A, a user may visually recognize that the investment allocations that may be made to various asset classes 204 during each period. Graph 1106A for example, illustrates that during the first period (Q1 in 2022), the investment allocation may be made to the buyout, infrastructure, and real estate equity asset classes. Additionally, graph 1106A may display the total investment allocation that may be made during each period.

As discussed above, the cumulative portfolio investment allocation verses risk aversion graph 1102A and the investment schedule graph 1106A may be interrelated. Accordingly, in response to a movement of the risk line 1108 along the horizontal axis to a different risk value, the allocations made to different asset classes 204 in each period illustrated in the investment schedule graph 1106A may change in real-time to reflect the new location of the risk line 1108. For example, suppose the risk line 1108 is moved to the right to a location illustrated in graph 1102B. In response to the new risk value associated with a new location of risk line 1108, each period in graph 1106B may display a new per period investment allocation in asset classes 204. For example, for a risk value associated with a location of the risk line 1108 in graph 1102A, graph 1106A illustrates that the investment allocation during the first period may be made to the buyout, infrastructure, and real estate equity asset classes. However, for a risk value associated with a location of the risk line 1108 in graph 1102B, graph 1106B illustrates that the investment allocation during the first period may be made only to the buyout asset class.

The information visually depicted in investment schedule graphs 1106A-B enables a user to visually recognize the per-period investment allocation that may be made during each period in different asset classes 204.

Notably, as the risk line 1108 continuously moves to different locations along the x-axis in graphs 1102A-B, the investment allocation at each period as shown in investment schedule graphs 1106A-B may continuously change to reflect different allocations of investments to different asset classes 204. The asset class allocations in different periods in graphs 1106A-B may stop changing once the risk line 1108 stops moving along the x-axis. For example, as the risk line 1108 moves from a location shown in graph 1102A to a location shown in graph 1102B, the allocation to asset classes 204 at each period may continuously change in real-time. This causes the allocation of asset classes 204 at each period shown in investment schedule graph 1106A to change in real-time as the risk line 1108 travels to the location associated with graph 1102B. The investment schedule graph 1106B stops changing and has a state shown in investment schedule graph 1106B once the risk line 1108 reaches the location in graph 1102B.

Figure 12:
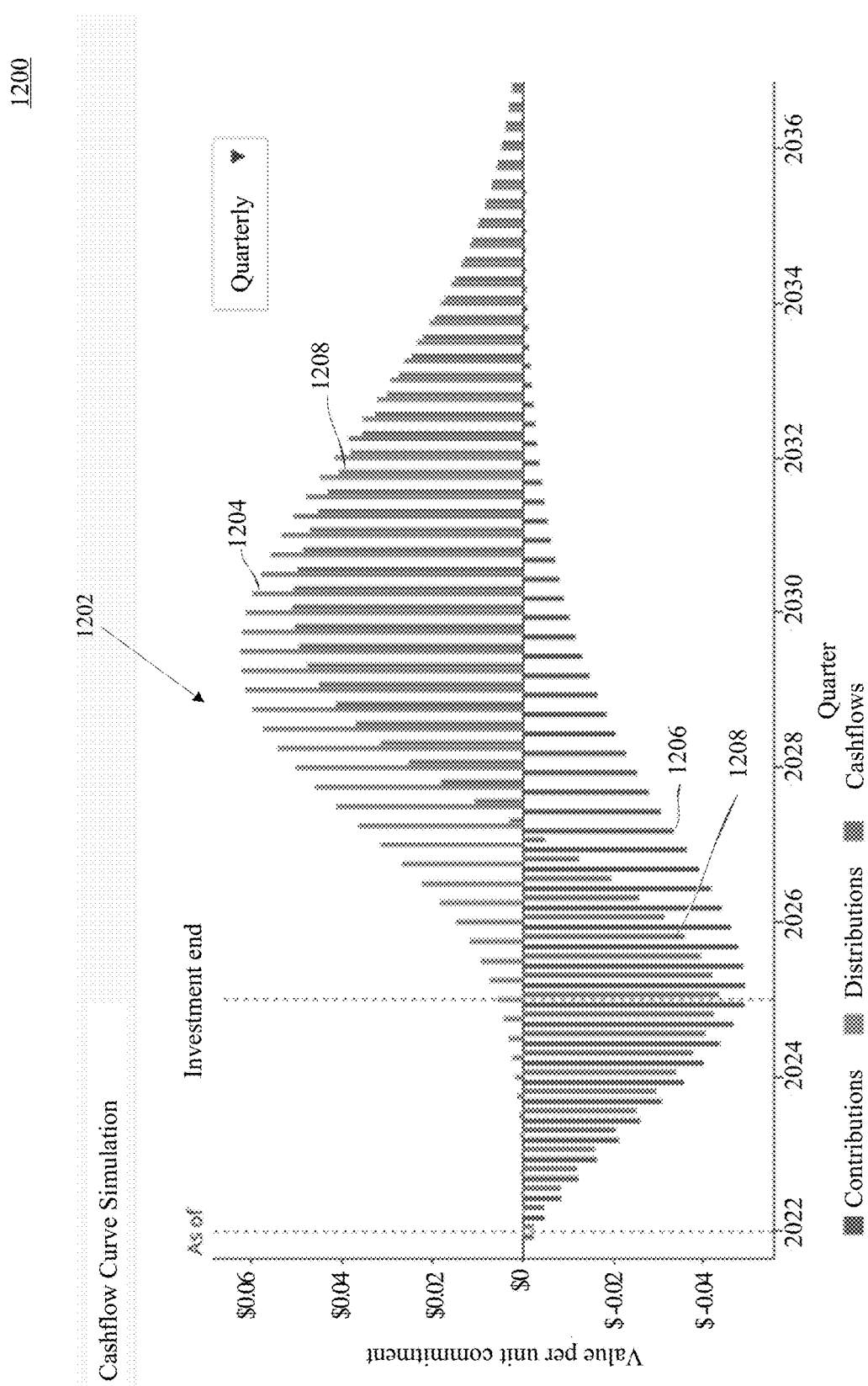
FIG. 12 illustrates a diagram of a cash flow of a portfolio, according to some embodiments.

In some embodiments, user interface 212 may also include a cash flow graph. FIG. 12 is a diagram 1200 of a graph illustrating a cash flow generated for a portfolio, according to some embodiments. The cash flow graph 1202 in FIG. 12 illustrates a cash flow, including contributions 1204, distributions 1206, and cash flow 1208 of portfolio 206 that is being invested according to investment schedule in graphs 1102B and 1104B shown in FIG. 11B. In some embodiments, cash flow graph 1202 may also be interrelated with graphs 1102A and 1102B. In other words, as the risk line 1108 continuously moves to different locations along the x-axis in graphs 1102A-B, the contributions 1204, distributions 1206, and a cash flow 1208 shown in the cash flow graph 1202 may continuously change to reflect different allocations of investments to different asset classes 204 of portfolio 206 based on the location of risk line 208. The contributions 1204, distributions 1206, and cash flow 1208 of portfolio 206 may stop changing once the risk line 1108 stops moving along the x-axis.

Figure 13:
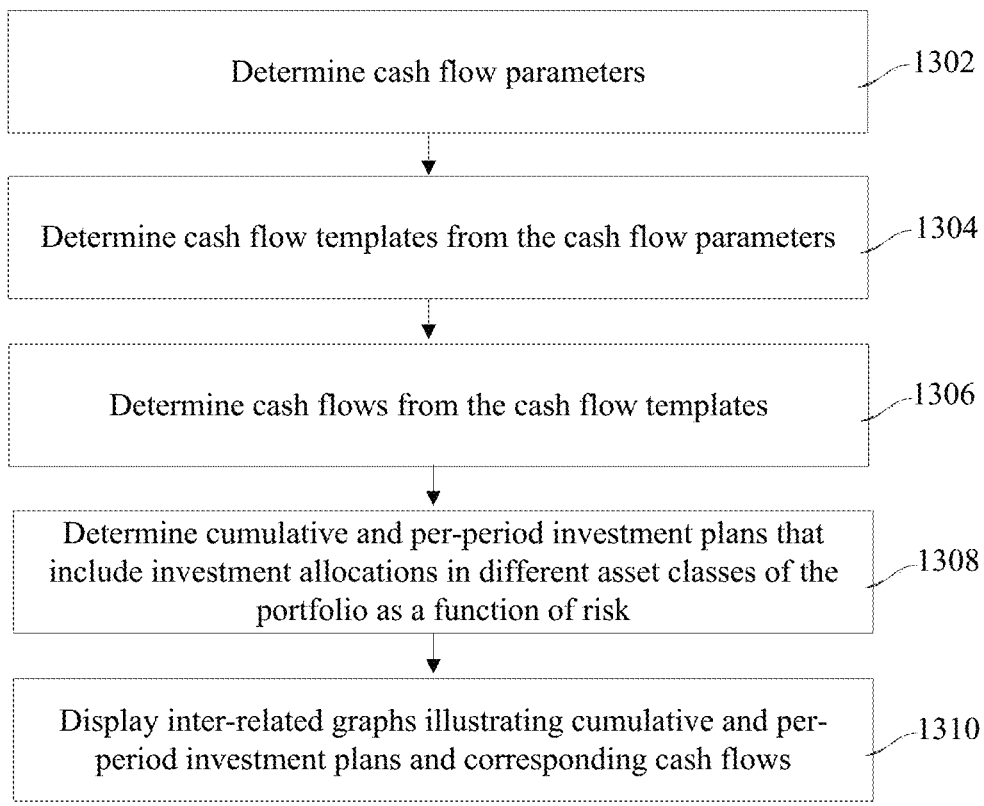
FIG. 13 is a diagram of a method for simulating a portfolio, according to some embodiments.

FIG. 13 is a diagram of a method 1300 for simulating a portfolio according to some embodiments. One or more of the processes 1302-1310 of method 1300 may be implemented, at least in part, in the form of executable code stored on non-transitory, tangible, machine-readable media that when run by one or more processors may cause the one or more processors to perform one or more of the processes 1302-1310.

At operation 1302, cash flow parameters are determined. As discussed above, the cash flow parameters may include MOIC, WAL, NPV, and IRR parameters. Further, as discussed above, the cash flow parameters may be based, in part, on capital calls $c^{call}$ and distributions $c^{dist}$ that occur over a time period T and are discussed with respect to Equations (1) through (10). The NPV and IRR parameters may also be based, in part, on an interest rate r. The cash flow parameters may have different values for different asset classes 204. In some embodiments, the MOIC parameter may also include a mean and standard deviation of MOIC to account for uncertainty in the cash flow that may be determined using a log-normal distribution of MOIC.

At operation 1304, cash flow templates are determined from the cash flow parameters. As discussed above, cash flow templates 210 for asset classes 204 may be determined, in part, from the cash flow parameters. Equations (11) through (14) describe how the cash flow templates 210 are determined. The cash flow templates 210 may have different values of the cash flow parameters. Cash flow templates may further include cash flow parameters such as MOIC M, $\mu^{call}$ representing an approximate time when half of the capital has been called, $\sigma^{call}$ representing dispersion in time the capital calls, $\mu^{dist}$ representing the approximate time when half of the distributions have been made, and $\sigma^{dist}$ representing the dispersion in time of the distributions.

At operation 1306, cash flows for a portfolio are determined from the cash flow templates. As discussed above, portfolio optimizer 106 may simulate cash flows for portfolio 206 given an investment amount 202 for different cash flow templates 210. The cash flow templates 210 may vary depending on different values of the cash flow parameters and interest rate. As discussed above, to determine cash flows, portfolio optimizer 106 may use Monte Carlo simulations.

At operation 1308, a portfolio may be simulated. As discussed above, Markowitz optimization may optimize portfolio 206 by generating investment plans for various cash flows determined in operation 1306 as a function of a risk aversion parameter. For example, portfolio optimizer 106 may determine determining a portion of investment amount 202 that may be allocated to each asset class in asset classes 204 for portfolio 206 to generate cash flows determined in operation 1306. In some instances, portfolio optimizer 106 may optimize portfolio 206 using a one-time investment amount 202. In this case, portfolio optimizer 106 may generate a cumulative investment plan for portfolio 206 based on a one-time investment. In other instances, portfolio optimizer 106 may optimize portfolio 206 using multi-period optimization where a portion of investment amount 202 may be allocated in different asset classes 204 over multiple periods. In this embodiment, operations 1306 and 1308 may repeat during each period. In this case, portfolio optimizer 106 may generate a cumulative investment plan for portfolio 206 and per-period investment plan that allocations portions of investment amount 202 during each period to different asset classes 204. Portfolio optimizer 106 may repeat the above process to generate various cumulative investment plans that maximize a cash flow for portfolio 206 for different values of the risk aversion parameter.

At operation 1310, portfolio simulations are displayed. For example, user interface 212 may display graphs that illustrate the cumulative investment plans in asset classes 204 for different risk values and also per-period investment plans for the multi-period investment allocations. Additionally, the user interface 212 may display the cash flows for the corresponding cumulative investment plans. As discussed above, the user interface may display the cumulative and per-period investment plans using interrelated graphs. In this way, when portfolio 206 is being simulated using different cumulative investment plans as a function of risk, the other graphs may display changes to cash flows and per-period investment allocations that are caused by the changes to the cumulative investment plans.

Figure 14:
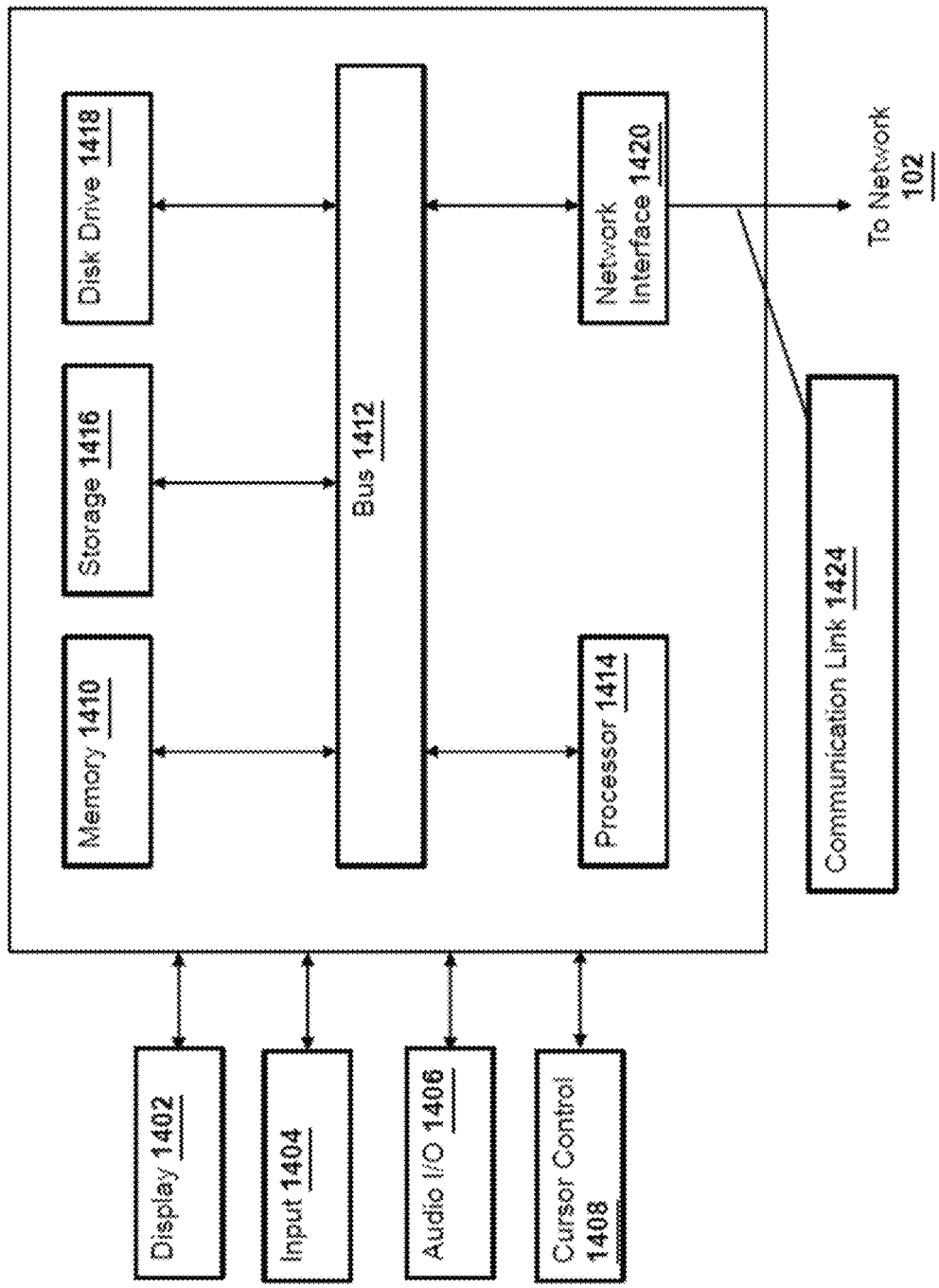
FIG. 14 is a block diagram of a computer system where embodiments may be implemented, according to an embodiment.

FIG. 14 is a block diagram of a computer system 1400 suitable for implementing one or more components performing one or more processes, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 1400 in a manner as follows. Computer system 1400 may be incorporated into devices discussed in FIG. 1.

The computer system 1400 includes a bus 1412 or other communication mechanism for communicating information data, signals, and information between various components of the computer system 1400. The components include an input/output (I/O) component 1404 that processes a user (i.e., sender, recipient, service provider) action, such as selecting keys from a keypad/keyboard, selecting one or more buttons or links, etc., and sends a corresponding signal to the bus 1412. The I/O component 1404 may also include an output component, such as a display 1402 and a cursor control 1408 (such as a keyboard, keypad, mouse, etc.). The display 1402 may be configured to present a login page for logging into a user account or a checkout page for purchasing an item from a merchant. An optional audio input/output component 1406 may also be included to allow a user to use voice for inputting information by converting audio signals. The audio I/O component 1406 may allow the user to hear audio. A transceiver or network interface 1420 transmits and receives signals between the computer system 1400 and other devices, such as another user device, a merchant server, or a service provider server via network 102. In one embodiment, the transmission is wireless, although other transmission mediums and methods may also be suitable. A processor 1414, which can be a micro-controller, digital signal processor (DSP), or other processing component, processes these various signals, such as for display on the computer system 1400 or transmission to other devices via a communication link 1424. The processor 1414 may also control transmission of information, such as cookies or IP addresses, to other devices.

The components of the computer system 1400 also include a system memory component 1410 (e.g., RAM), a static storage component 1416 (e.g., ROM), and/or a disk drive 1418 (e.g., a solid-state drive, a hard drive). The computer system 1400 performs specific operations by the processor 1414 and other components by executing one or more sequences of instructions contained in the system memory component 1410.

Logic may be encoded in a computer readable medium, which may refer to any medium that participates in providing instructions to the processor 1414 for execution. Such a medium may take many forms, including but not limited to, non-volatile media, volatile media, and transmission media. In various implementations, non-volatile media includes optical or magnetic disks, volatile media includes dynamic memory, such as the system memory component 1410, and transmission media includes coaxial cables, copper wire, and fiber optics, including wires that comprise the bus 1412. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the devices in system 100. In various other embodiments of the present disclosure, a plurality of computer systems 1400 coupled by the communication link 1424 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A method for simulating a portfolio, the method comprising:
    providing, to a processor, a plurality of cash flow parameters;
    generating, by the processor, cash flow templates from the plurality of cash flow parameters;
    generating, by the processor, cash flows for a plurality of asset classes in the portfolio from the cash flow templates and an investment amount;
    generating, by the processor and using a Markowitz optimization, the cash flows, and a risk parameter, a plurality of investment allocations from the investment amount to the plurality of asset classes in the portfolio, wherein the plurality of investment allocations to the plurality of asset classes are generated to maximize a cash flow of the portfolio for a corresponding value of the risk parameter, wherein the Markowitz optimization generated the plurality of investment allocations maximize a net present value of the portfolio for a corresponding risk parameter, wherein the net present value of the portfolio is a function of a multiple of invested capital (MOIC) cash flow parameter;
    causing to be displayed, in a first user interface, a first graph displaying the plurality of investment allocations to the plurality of asset classes in the portfolio as a function of risk;
    causing to be displayed, in a second user interface, a second graph displaying a cash flow of the portfolio that corresponds to one set of the plurality of investment allocations;
    receiving an input that continuously moves a computer-generated marker along a risk axis in the first graph of the first user interface;
    selecting, in response to the continuous movement of the computer-generated marker on the first user interface, different sets of the plurality of investment allocations;
    initiating, in response to the continuous movement of the computer-generated marker on the first user interface, computing instructions that cause the cash flow displayed in the second graph of the second user interface to update in real-time and in correspondence with the movement of the computer-generated marker on the first user interface until the computer-generated marker stops moving and stops selecting different sets of the plurality of investment allocations;
    causing to be displayed, on a third user interface, a cash flow for a selected set of the plurality of investment allocations; and
    changing the cash flow in the third user interface in response to the movement of the computer-generated marker along the risk axis of the first user interface.

2. The method of claim 1, wherein the plurality of cash flow parameters are based on capital calls and capital distributions associated with the plurality of asset classes.

3. The method of claim 2, wherein at least one cash flow parameter is based on a ratio of the capital calls to the capital distributions of the plurality of asset classes.

4. The method of claim 2, wherein at least one cash flow parameter is based on a shape of the capital calls or the capital distributions over time.

5. The method of claim 1, wherein values of cash flow parameters in the plurality of cash flow parameters associated with one asset class are different from values of other cash flow parameters in the plurality of cash flow parameters associated with other asset classes in the plurality of asset classes.

6. The method of claim 1, wherein a cash flow template in the plurality of cash flow templates is defined using different cash flow parameters in the plurality of cash flow parameters than other cash flow templates in the plurality of cash flow templates.

7. The method of claim 1, further comprising:
generating the MOIC cash flow parameter from the cash flow parameters using a log-normal distribution; and
generating the cash flows for the plurality of asset classes from the cash flow templates and the investment amount by varying the MOIC cash flow parameter and fixing other cash flow parameters in the plurality of cash flow parameters.

8. The method of claim 1, further comprising:
simulating the cash flow of the portfolio by:
normalizing the cash flows for the plurality of asset classes, one cash flow for one asset class; and
adding the normalized cash flows.

9. The method of claim 1, wherein the plurality of investment allocations include one investment allocation for one asset class and the one investment allocation includes a minimum and maximum amounts to be invested in the one asset class.

10. The method of claim 1, wherein the MOIC cash flow parameter is for the cash flows and an interest rate.

11. The method of claim 1, wherein the cash flows for the plurality of asset classes in the portfolio are generated over a first predefined number of periods for an investment period that spans a second predefined number of periods.

12. The method of claim 11, wherein generating the plurality of investment allocations further comprises:
for each period in the first predefined number of periods, generating a subset of investment allocations in the plurality of investment allocations to different asset classes in the plurality of asset classes.

13. The method of claim 12, wherein the subset of investment allocations are constrained by a minimum investment amount and a maximum investment amount to be invested during each period.

14. The method of claim 12, wherein the subset of investment allocations are constrained by a minimum investment amount and a maximum investment amount to be invested in each asset class in the plurality of asset classes over the first predefined number of periods.

15. The method of claim 12, wherein the subset of investment allocations made during each period is a fixed portion of the investment amount.

16. The method of claim 11, further comprising:
generating a cumulative investment plan for the portfolio, wherein the cumulative investment plan includes subsets of investment allocations in the plurality of asset classes for each period during the first predefined number of periods.

17. A system for simulating a portfolio, the system comprising:
a memory configured to store a portfolio optimizer; and
a processor coupled to the memory and configured to cause the portfolio optimizer to perform operations, the operations comprising:
accessing cash flow parameters;
generating cash flow templates from the cash flow parameters;
generating, for each period, cash flows for a plurality of asset classes of the portfolio from the cash flow templates;
generating, using a Markowitz optimization, the cash flows, and a risk parameter, commitment allocation plans for the portfolio, wherein the commitment allocation plans indicate corresponding investment amounts to be invested in at least some of the plurality of asset classes during each period and wherein the Markowitz optimization generated commitment allocation plans maximize a net present value of the portfolio for a corresponding risk parameter, wherein the net present value of the portfolio is a function of a multiple of invested capital (MOIC) cash flow parameter;
causing to be displayed, in a first user interface, a first graph displaying the commitment allocation plans as a function of risk;
receiving an input that selects, on the first user interface, one of the commitment allocation plans;
in response to the input, causing to be displayed, on a second user interface, a second graph displaying an investment amount to be invested in the at least some of the plurality of asset classes during each period that corresponds to the selected one of the commitment allocation plans;
receiving input that continuously moves a computer-generated marker along a risk axis in the first graph of the first user interface, wherein the movement of the computer-generated marker modifies a selection of the one of the commitment allocation plans in the first graph;
initiating, in response to the continuous movement of the computer-generated marker on the first user interface, computing instructions that cause real-time updates on the second graph of the second user interface to the investment amount for each period and in correspondence with the continuous movement of the computer-generated marker until the computer generated marker stops moving, wherein the investment amount is associated with the modified selection of the one of the commitment allocation plans;
causing to be displayed, on a third user interface, a cash flow for the selected one of the commitment allocation plans; and
changing the cash flow in the third user interface in response to the movement of the computer-generated marker along the risk axis of the first user interface.

18. A system for simulating a portfolio, the system comprising:
a memory configured to store a portfolio optimizer; and
a processor coupled to the memory and configured to cause the portfolio optimizer to perform operations, the operations comprising:
accessing a plurality of cash flow parameters, wherein values of the plurality of cash flow parameters are different for a plurality of asset classes;

generating cash flow templates from the plurality of cash flow parameters;

generating cash flows for the plurality of asset classes of the portfolio from the cash flow templates and an investment amount, wherein the cash flows are different for each of the plurality of asset classes;

generating, using a Markowitz optimization and the cash flows, a plurality of investment allocations from the investment amount to the plurality of asset classes in the portfolio, wherein the Markowitz optimization generated investment allocations maximize a net present value of the portfolio for a corresponding risk parameter, wherein the net present value of the portfolio is a function of a multiple of invested capital (MOIC) cash flow parameter;

displaying the plurality of investment allocations in the portfolio as a function of risk using a first user interface;

displaying a cash flow for the portfolio that corresponds to one of the plurality of investment allocations on a second user interface;

receiving input that continuously moves a computer-generated marker along a risk axis in a first graph of the first user interface, wherein the movement of the computer-generated marker selects different sets of the plurality of investment allocations;

in response to the continuous movement of the computer-generated marker in the first user interface, initiating computing instructions that cause the second user interface to modify the cash flow for the portfolio in real-time and in correspondence with the movement of the computer-generated marker along the risk axis in the first graph of the first user interface until the computer-generated marker stops moving and stops selecting different sets of investment allocations in the plurality of investment allocations;

causing to be displayed, on a third user interface, a cash flow for a selected set of the investment allocations; and changing the cash flow in the third user interface in response to the movement of the computer-generated marker along the risk axis of the first user interface.

* * * * *